United States Patent
Wei

(10) Patent No.: US 11,405,876 B2
(45) Date of Patent: Aug. 2, 2022

(54) DATA TRANSMISSION METHOD AND RELATED APPARATUS

(71) Applicant: HUAWEI TECHNOLOGIES CO., LTD., Guangdong (CN)

(72) Inventor: Dongdong Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/881,531

(22) Filed: May 22, 2020

(65) Prior Publication Data

US 2020/0288422 A1 Sep. 10, 2020

Related U.S. Application Data

(63) Continuation of application No. PCT/CN2018/116399, filed on Nov. 20, 2018.

(30) Foreign Application Priority Data

Nov. 22, 2017 (CN) .......................... 201711174646.1

(51) Int. Cl.
*H04B 7/185* (2006.01)
*H04W 56/00* (2009.01)

(52) U.S. Cl.
CPC .... *H04W 56/0005* (2013.01); *H04B 7/18513* (2013.01); *H04W 56/0045* (2013.01)

(58) Field of Classification Search
None
See application file for complete search history.

(56) References Cited

U.S. PATENT DOCUMENTS

| 5,809,397 | A | 9/1998 | Harthcock et al. |
| 2009/0086714 | A1 | 4/2009 | Song et al. |
| 2021/0029658 | A1* | 1/2021 | Mahalingam ..... H04W 56/0005 |

FOREIGN PATENT DOCUMENTS

| CA | 3003667 | A1 | | 5/2017 |
| CN | 102036364 | | * | 9/2009 |
| CN | 101998614 | A | | 3/2011 |
| CN | 102036364 | A | * | 4/2011 |
| CN | 102036364 | A | | 4/2011 |
| CN | 102201856 | A | | 9/2011 |
| CN | 102695264 | A | | 9/2012 |
| CN | 103037496 | A | | 4/2013 |
| CN | 107046447 | A | | 8/2017 |
| WO | 2015066872 | A1 | | 5/2015 |

(Continued)

OTHER PUBLICATIONS

Huawei, HiSilicon, "Considerations of NR UL operation," 3GPP TSG RAN WG1 Meeting #88, R1-1701668, Athens, Greece, Feb. 13-17, 2017, 5 pages.

(Continued)

*Primary Examiner* — Khalid W Shaheed
(74) *Attorney, Agent, or Firm* — Fish & Richardson P.C.

(57) ABSTRACT

This application discloses a data transmission method. The method includes:
obtaining a baseline value, wherein the baseline value indicates a time interval between a downlink frame timing and an uplink frame timing, and is associated with a timing advance for sending uplink data; and receiving the uplink data. This application further provides a base station and user equipment.

15 Claims, 14 Drawing Sheets

(56) References Cited

FOREIGN PATENT DOCUMENTS

WO  2017072745 A1  5/2017
WO  2017150453 A1  9/2017

OTHER PUBLICATIONS

Office Action issued in Chinese Application No. 201711174646.1 dated Feb. 21, 2020, 20 pages (with English translation).
PCT International Search Report and Written Opinion issued in International Application No. PCT/CN2018/116399 dated Feb. 11, 2019, 15 pages (with English translation).
ETSI TS 101 376-5-7 V3.4.1 (Oct. 2015), "GEO-Mobile Radio Interface Specifications (Release 3); Third Generation Satellite Packet Radio Service; Part 5: Radio interface physical layer specifications; Sub-part 7: Radio Subsystem Synchronization; GMR-1 3G 45.010," Oct. 2015, 64 pages.
Extended European Search Report issued in European Application No. 18881944.5 dated Nov. 26, 2020, 12 pages.
Office Action issued in Chinese Application No. 201711174646.1 dated Feb. 24, 2021, 6 pages.
Office Action issued in Chinese Application No. 201711174646.1 dated Jul. 14, 2021, 6 pages (with English translation).

* cited by examiner

DATA TRANSMISSION METHOD AND RELATED APPARATUS

CROSS-REFERENCE TO RELATED APPLICATIONS

This application is a continuation of international Application No. PCT/CN2018/116399, filed on Nov. 20, 2018, which claims priority to Chinese Patent Application No. 201711174646.1, filed on Nov. 22, 2017. The disclosures of the aforementioned applications are hereby incorporated by reference in their entireties.

TECHNICAL FIELD

This application relates to the field of communications technologies, and in particular, to a data transmission method and a related apparatus.

BACKGROUND

Currently, terrestrial mobile communications infrastructure has provided good mobile communications services for major land areas. However, satellites are still the only reliable choice on the sea, in the air, and in remote or extreme areas on the land, especially in the emergency response, rescue and relief work major natural disasters, military applications, and other special conditions.

Currently, in a design of a long term evolution (LIE) communications system, a new radio (NR) communications system, or the like, because orthogonal multiple access is used, different user equipment (UE) use orthogonal time-frequency resources. Because a cell center user and a cell edge user have different transmission delays, to maintain uplink transmission on orthogonal resources, compared with the cell center user, the cell edge user needs to send data in advance, so that an uplink transmission signal of the cell edge user and an uplink transmission signal of the cell center user may arrive at the same time.

When a timing advance is set, both a downlink transmission delay and an uplink transmission delay need to be considered. Therefore, the timing advance is adjusted based on twice a transmission delay. However, in a large transmission delay scenario, for example, in satellite communication, because a transmission delay of the satellite communication is excessively long, notifying the timing advance by using twice the transmission delay increases signaling overheads.

SUMMARY

This application provides a data transmission method and a related apparatus. In a large transmission delay scenario, a value range of a timing advance calculated by using a baseline value is definitely smaller than a value range of a transmission delay value. Therefore, overheads of the timing advance can be effectively reduced.

A first aspect of the embodiments of this application provides a data transmission method. The method is applied to a data transmission system, and the data transmission system includes a base station and at least one UE. The following describes how to perform data transmission.

First, the base station may obtain a baseline value, the baseline value is not zero, and the baseline value is used to indicate a time interval between downlink frame timing and uplink frame timing. Optionally, the time interval is an integer multiple of a time unit, and the time unit is a subframe, a slot, a non-slot, or an orthogonal frequency division multiplexing OFDM symbol, where the non-slot is also called non-slot. In addition, the baseline value is related to a transmission delay value. The baseline value may be a number that is an integer multiple of a time unit, and the time unit may be a subframe, a slot, or an orthogonal frequency division multiplexing symbol.

The base station or the UE may determine a timing advance based on the baseline value and the transmission delay value, the UE determines, base on the timing advance, a difference between uplink timing and downlink timing on a UE side, and the UE sends uplink data based on the uplink frame timing on the UE side.

In this embodiment of this application, the data transmission method is provided. First, the base station obtains the baseline value, where the baseline value is used to indicate a difference between the downlink frame timing of the base station and the uplink frame timing of the base station. The baseline value is used to determine the timing advance, and the timing advance is used to determine the difference between the uplink frame timing and the downlink frame timing on the UE side. The UE sends the uplink data based on the uplink timing, and then the base station receives the uplink data. In the foregoing manner, in a large transmission delay scenario, a value range of a tuning advance calculated by using a baseline value is definitely smaller than a value range of a transmission delay value. Therefore, overheads of the timing advance can be effectively reduced.

In a possible design, in a first implementation of the first aspect of the embodiments of this application, specific steps of obtaining the baseline value may include:

First, the base station obtains a satellite type of a target satellite. The target satellite is a satellite that communicates with the UE. Then, the base station may determine the baseline value based on the satellite type of the target satellite. The satellite type includes a satellite altitude and an on-board processing capability of the satellite. Based on the altitude, target satellites can be classified into a low earth orbit satellite, a medium earth orbit satellite and a geosynchronous orbit satellite. Based on the on-board processing capability, target satellites can be classified into a satellite with an on-board processing capability and a satellite with a bent-pipe forwarding capability. A value range of the baseline value can be adjusted based on the satellite altitude and the on-board processing capability.

In addition, in this embodiment of this application, in a process of obtaining the baseline value, the base station first needs to obtain the satellite type of the target satellite, and then determines the baseline value based on the satellite type of the target satellite. In the foregoing manner, it may be learned that the baseline value is associated with the satellite type, so that a closest baseline value may be determined based on different satellite types, thereby ensuring that the baseline value is more accurate.

In addition, the baseline value may be further associated with a beam of the target satellite, and the baseline value may be determined based on the satellite type of the target satellite and the beam of the target satellite.

In a possible design, in a second implementation of the first aspect of the embodiments of this application, if the base station calculates the timing advance, the timing advance needs to be determined based on the baseline value and the transmission delay value, where the transmission delay value indicates a propagation delay of data transmission between the base station and the UE. After calculating the timing advance, the base station sends the timing advance to the UE.

In addition, a formula for calculating the timing advance may meet:

TA=a×Delay−b×Tbase, where

TA represents the timing advance, Delay represents the transmission delay value. Tbase represents the baseline value, and both a and b represent non-zero coefficients.

In addition, in this embodiment of this application, the base station may calculate the timing advance based on the baseline value and the transmission delay value, and then deliver the calculated timing advance to the UE, so that the UE sends the uplink data based on the corresponding timing advance. In the foregoing manner, the base station may actively determine the timing advance of the UE, where the value range of the timing advance is smaller than the value range of the transmission delay value, thereby reducing overheads of the timing advance. In this case, measurement of the timing advance on the base station side can reflect practicability and feasibility of the solution.

In a possible design, in a third implementation of the first aspect of the embodiments of this application, if the UE calculates the timing advance, the UE needs to determine the timing advance based on the baseline value and the transmission delay value. In other words, after the base station obtains the baseline value, the method may further include the following step:

The base station sends the baseline value to the UE, and then the UE determines the timing advance based on the baseline value and the transmission delay value. Similarly, a formula for calculating the timing advance may also meet:

TA=a×Delay−b×Tbase, where

TA represents the timing advance, Delay represents the transmission delay value, Tbase represents the baseline value, and both a and b represent non-zero coefficients.

In addition, in this embodiment of this application, after receiving the baseline value sent by the base station, the UE may calculate the timing advance based on the baseline value and the transmission delay value, then determine, based on the timing advance, the difference between the uplink frame timing and the downlink frame timing on the UE side, and send the uplink data based on the uplink frame timing. In the foregoing manner, the UE may determine the timing advance, and the value range of the timing advance is smaller than the value range of the transmission delay value, thereby reducing overheads of the timing advance. In addition, the UE side measures the timing advance, reflecting flexibility and feasibility of the solution.

In a possible design, in a fourth implementation of the first aspect of the embodiments of this application, the sending, by the base station, the baseline value to the UE may specifically include the following two cases:

When UEs in a same cell (or beam range) use a same baseline value, the base station may send a broadcast message to the UEs in the same cell (or beam range), that is, the baseline value is carried in the broadcast message.

When UEs in a same cell (or beam range) use different baseline values, the base station may send at least one of downlink control information, group downlink control information, radio resource control information, and a media access control element to the UEs in the same cell (or beam range). That is, the baseline value is carried in the downlink control information, the group downlink control information, the radio resource control information, and the media access control element. The base station side sets a baseline value for each UE, and subsequent adjustment of a timing advance of each UE is based on the baseline value.

Further, in this embodiment of this application, the base station may further send the baseline value to the UE by using at least one of the broadcast message, the downlink control information, the group downlink control information, the radio resource control information, and the media access control element. In the foregoing manner, the base station may simultaneously send the baseline values to all UEs in a cell, or may separately send the baseline value to each UE, so that the solution can be applied to different scenarios, thereby improving flexibility and practicability of the solution.

A second aspect of the embodiments of this application provides a data transmission method. The method is applied to a data transmission system, and the data transmission system includes a base station and at least one UE. The following describes how to perform data transmission.

First, the UE may obtain a baseline value, and the baseline value may be represented by a difference between downlink frame timing of the base station and uplink frame timing of the base station. In addition, the baseline value is related to a transmission delay value. The baseline value is a number that is an integer multiple of a time unit, and the time unit may be a subframe, a slot, or an orthogonal frequency division multiplexing symbol. The base station or the UE may determine a timing advance based on the baseline value and the transmission delay value, the UE determines, based on the timing advance, a difference between uplink timing and downlink timing on a UE side, and the UE sends uplink data based on the uplink frame timing on the UE side.

In this embodiment of this application, the data transmission method is provided. First, the UE obtains the baseline value, where the baseline value is used to indicate the difference between the downlink frame timing of the base station and the uplink frame timing of the base station, and the baseline value is used to determine the timing advance, the timing advance is used to determine the difference between the uplink frame timing and the downlink frame timing on the UE side, and then the UE sends the uplink data based on the uplink timing on the UE side. According to the foregoing UE, in a large transmission delay scenario, a value range of a timing advance calculated by using a baseline value is definitely smaller than a value range of a transmission delay value. Therefore, overheads of the timing advance can be effectively reduced.

In a possible design, in a first implementation of the second aspect of the embodiments of this application, the obtaining, by UE, a baseline value may specifically include the following two cases:

When UEs in a same cell (or beam range) use a same baseline value, the base station may send a broadcast message to the UEs in the same cell (or beam range), that is, the baseline value is carried in the broadcast message.

When UEs in a same cell (or beam range) use different baseline values, the base station may send at least one of downlink control information, group downlink control information, radio resource control information, and a media access control element to the UEs in the same cell (or beam range). That is, the baseline value is carried in the downlink control information, the group downlink control information, the radio resource control information, and the media access control element. The base station side sets a baseline value for each UE, and subsequent adjustment of a timing advance of each UE is based on the baseline value.

After obtaining the baseline value, the UE may determine the timing advance based on the baseline value and a transmission delay value that is measured by the UE, where the transmission delay value indicates a propagation delay of data transmission between the base station and the user equipment UE.

In addition, in this embodiment of this application, the UE may further receive, by using at least one of the broadcast message, the DCI, the group DCI, the RRC information, and the MAC CE, the baseline value sent by the base station. In the foregoing manner, the base station may simultaneously send the baseline values to all UEs in a cell, or may separately send the baseline value to each UE, so that the solution can be applied to different scenarios, thereby improving flexibility and practicability of the solution. In addition, the UE side may further measure the timing advance, reflecting feasibility of the solution.

A third aspect of the embodiments of this application provides a data transmission method. The method is applied to a data transmission system, and the data transmission system includes a base station and at least one UE. The following describes how to perform data transmission.

First, the UE measures a transmission delay value between the UE and the base station. The transmission delay value indicates a propagation delay of data transmission between the base station and the UE. Then, the UE may determine a timing advance based on a baseline value and the transmission delay value. Similarly, a formula for calculating the timing advance may be:

$$TA = a \times Delay - b \times Tbase, \text{ where}$$

TA represents the timing advance, Delay represents the transmission delay value, Tbase represents the baseline value, and both a and b represent non-zero coefficients.

Next, the UE reports, to the base station, the baseline value used in a process of calculating the timing advance. The UE reports the baseline value to the base station in a plurality of manners, for example, by using a media access control element or in a form of data, or in an uplink transmission process of random access.

Finally, after calculating the timing advance, the UE determines a difference between the uplink timing on the UE side and downlink timing on the UE side based on the timing advance, and sends the uplink data to the base station based on the uplink timing on the UE side.

In this embodiment of this application, the data transmission method is provided. First, the UE obtains the baseline value, where the baseline value is used to indicate a difference between downlink frame timing of the base station and uplink frame timing of the base station, the baseline value is used to determine the timing advance, and the timing advance is used to send the uplink data. Then, the UE sends the uplink data based on the timing advance. In the foregoing manner, in a large transmission delay scenario, a value range of a timing advance calculated by using a baseline value is definitely smaller than a value range of a transmission delay value. Therefore, overheads of the timing advance can be effectively reduced.

A fourth aspect of the embodiments of this application provides a communications apparatus. The communications apparatus includes:

an obtaining module, configured to obtain a baseline value, where the baseline value is used to indicate a time interval between downlink frame timing and uplink frame timing, the time interval is an integer multiple of a time unit, the time unit is a subframe, a slot, a non-slot, or an orthogonal frequency division multiplexing OFDM symbol, the baseline value is used to determine a timing advance, and the timing advance is used to send uplink data; and a receiving module, configured to receive the uplink data.

Optionally, the communications apparatus may be a base station.

A fifth aspect of the embodiments of this application provides a communications apparatus. The communications apparatus includes:

an obtaining module, configured to obtain a baseline value, where the baseline value is used to indicate a time interval between downlink frame timing and uplink frame timing, optionally, the time interval is an integer multiple of a time unit, the time unit is a subframe, a slot, a non-slot, or an orthogonal frequency division multiplexing OFDM symbol, the baseline value is used to determine a timing advance, and the timing advance is used to send uplink data; and a sending module, configured to send the uplink data by using the timing advance.

Optionally, the communications apparatus may be UE.

A sixth aspect of the embodiments of this application provides a communications apparatus. The communications apparatus includes a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory; to perform the method according to the first aspect.

Optionally, the communications apparatus may be a base station.

A seventh aspect of the embodiments of this application provides a communications apparatus. The communications apparatus includes a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory; the transceiver, and the processor communicate with each other; and the processor is configured to invoke the program and the instruction in the memory; to perform any method according to the second aspect.

Optionally, the communications apparatus may be UE.

According to an eighth aspect, an embodiment of this application provides a computer device. The computer device includes a processor, a memory, a bus, and a communications interface, where the memory is configured to store a computer executable instruction, the processor is connected to the memory by using the bus, and when the server runs, the processor executes the computer executable instruction stored in the memory, so that the server is enabled to perform the method in any one of the foregoing aspects.

According to a ninth aspect, an embodiment of this application provides a computer-readable storage medium, configured to store a computer software instruction used in the foregoing method. When the computer software instruction is run on a computer, the computer is enabled to perform the method in any one of the foregoing aspects.

According to a tenth aspect, an embodiment of this application provides a computer program product including an instruction. When the computer program product is run on a computer, the computer is enabled to perform the method in any one of the foregoing aspects.

In addition, for technical effects brought by any design of the fourth aspect to the tenth aspect, refer to technical effects brought by different designs of the first aspect to the third aspect. Details are not described herein again.

It can be learned from the foregoing technical solutions that this application has the following advantages:

In the embodiments of this application, the data transmission method is provided. First, the base station obtains the baseline value, where the baseline value is used to indicate the difference between the downlink frame timing of the base station and the uplink frame timing of the base station, the baseline value is used to determine the timing advance, and the timing advance is used to send the uplink data. Then, the base station receives the uplink data. In the foregoing manner, in the large transmission delay scenario, the value range of the timing advance calculated by using the baseline value is definitely smaller than the value range of the transmission delay value. Therefore, signaling overheads for notifying the timing advance can be effectively reduced.

DESCRIPTION OF EMBODIMENTS

This application provides a data transmission method and a related apparatus. In a large transmission delay scenario, a value range of a tinting advance calculated by using a baseline value is definitely smaller than a value range of a transmission delay value. Therefore, overheads of the timing advance can be effectively reduced.

In the specification, claims, and accompanying drawings of this application, the terms "first", "second", "third", "fourth", and so on (if existent) are intended, to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units or steps expressly listed, but may include other steps or units not expressly listed or inherent to such a process, method, system, product, or device.

Figure 1:
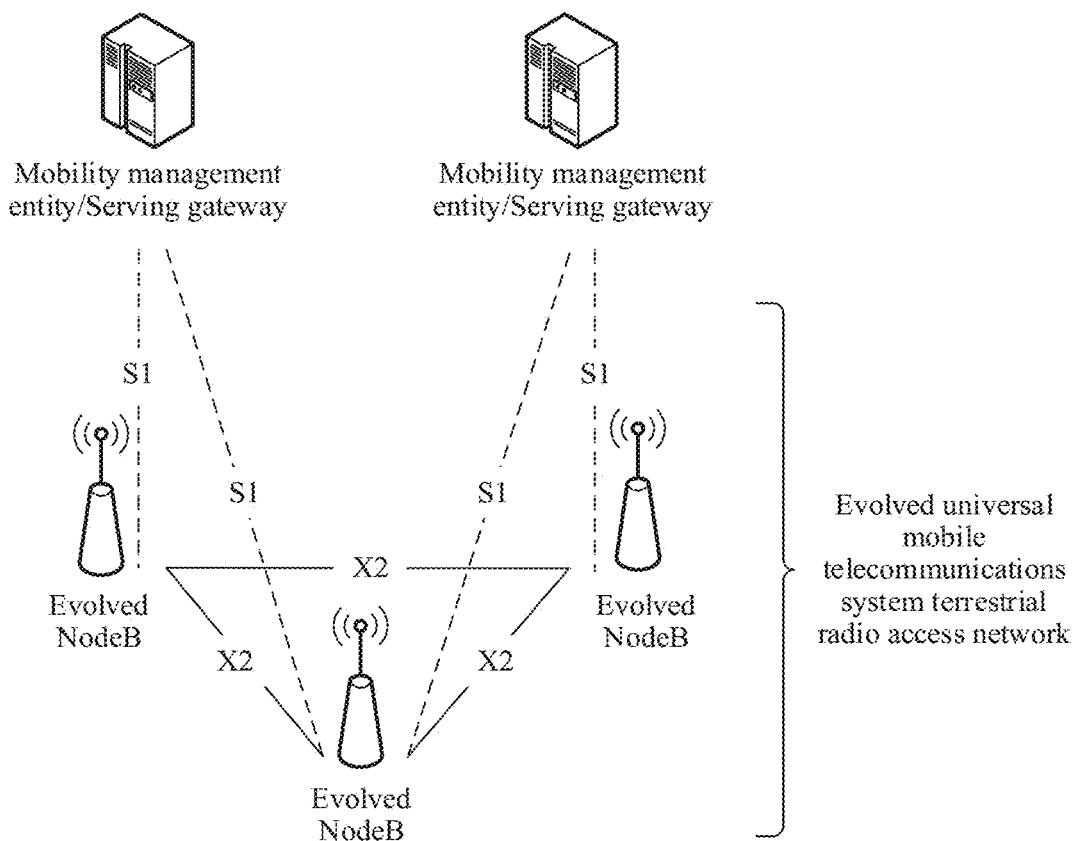
FIG. 1 is a schematic architectural diagram of a long term evolution system.

It should be understood that this application may be applied to a long term evolution (LTE) system or a new radio (NR) system. The following uses the LIE system as an example for description. FIG. 1 is a schematic architectural diagram of a long term evolution system, and an architecture of an evolved universal mobile telecommunications system terrestrial radio access network (evolved universal mobile telecommunications system. E-UTRAN) is shown in FIG. 1. A relationship between evolved NodeBs (eNB) is reflected in the E-UTRAN, that is, a communication connection is established between the eNBs by using an X2 interface. A connection relationship between an eNB and a core network node is further reflected in the E-UTRAN, that is, a communication connection is established between the eNB and the core network node by using an S1 interface. The core network node may be a mobility management entity (MME) and a serving gateway (SGW).

It may be understood that this application may be further applied to another communications system. The LTE system and the NR system are merely examples, and should not be construed as a limitation on this application.

It should be understood that this application is mainly applied to a large transmission delay scenario, for example, a satellite communication scenario. In the satellite communication scenario, because a satellite is far away from the ground, a relatively large transmission delay is caused. In addition, to increase an overall satellite capacity of a satellite system, there are a plurality of satellite beams on a satellite side, and each beam may correspond to one cell, or each satellite corresponds to one cell. However, because the satellite is hundreds of, thousands of, or even tens of thousands of kilometers above the ground, a coverage radius of a single cell of the satellite is generally hundreds of or even thousands of kilometers. In this case, a distance between a center user and an edge user in the cell may reach hundreds of kilometers (with a transmission delay difference of several milliseconds), which is far greater than a cell radius of 100 kilometers in LTE. The embodiments of this application may also be applied to another scenario in which a transmission delay is relatively large.

The base station in this application is a network device configured to communicate with a mobile device, for example, a device configured to communicate with the mobile device in satellite communication, an access point (AP) in a WLAN, a base transceiver station (BTS) in GSM or code division multiple access (CDMA), a NodeB (NB) in WCDMA, an evolved NodeB (evolutional node B, eNB or eNodeB) in LIE, a relay station, an access point, a vehicle-mounted device, a wearable device, a base station in a future 5G network, a device that is in a future evolved public land mobile network (PLMN) and that is configured to communicate with the mobile device, or the like. For ease of understanding, the following describes in detail the data transmission method in this application by using three embodiments. Details are as follows:

Embodiment 1: A Base Station Determines a Timing Advance

Figure 2:
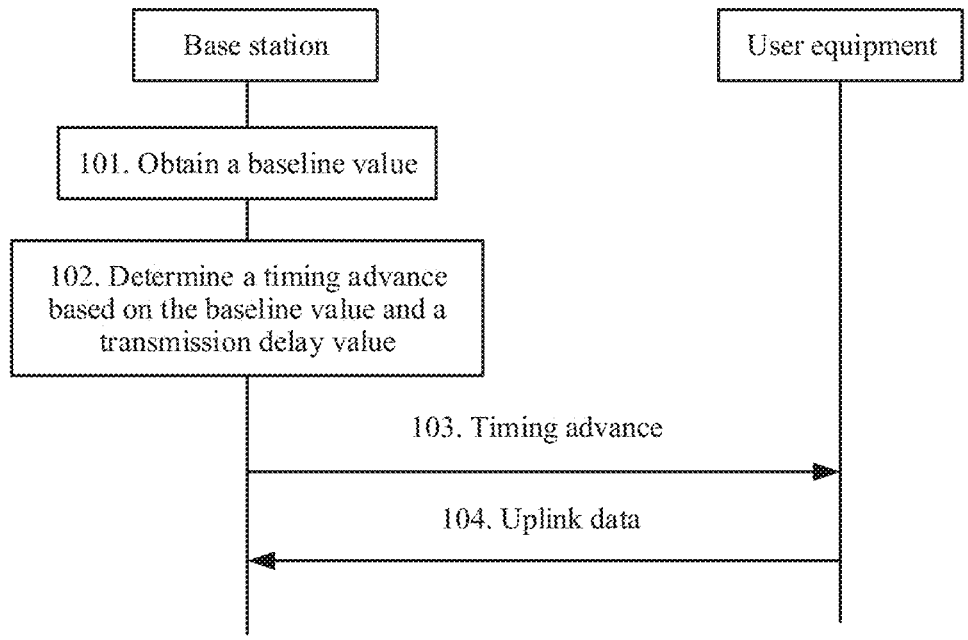
FIG. 2 is a schematic diagram of an embodiment of a data transmission method according to the embodiments of this application.

FIG. 2 is a schematic diagram of an embodiment of a data transmission method according to the embodiments of this application. The data transmission method is applied to a data transmission system. The data transmission system includes a base station and UE. This embodiment of the data transmission method in the embodiments of this application includes the following steps.

101. The base station obtains a baseline value, where the baseline value is used to indicate a time interval between downlink frame timing and uplink frame timing, the baseline value is used to determine a timing advance, and the timing advance is used to send uplink data.

In this embodiment, the base station first sets a baseline value, and the baseline value is mainly used to indicate a difference between the downlink frame timing of the base station and the uplink frame timing of the base station.

The baseline value is associated with a transmission delay value. The baseline value is a value that is an integer multiple of a time unit, and the time unit may be a subframe, a slot, or an OFDM symbol. The following describes meanings of the baseline value by using FIG. 3, FIG. 4, and FIG. 5.

Figure 3:
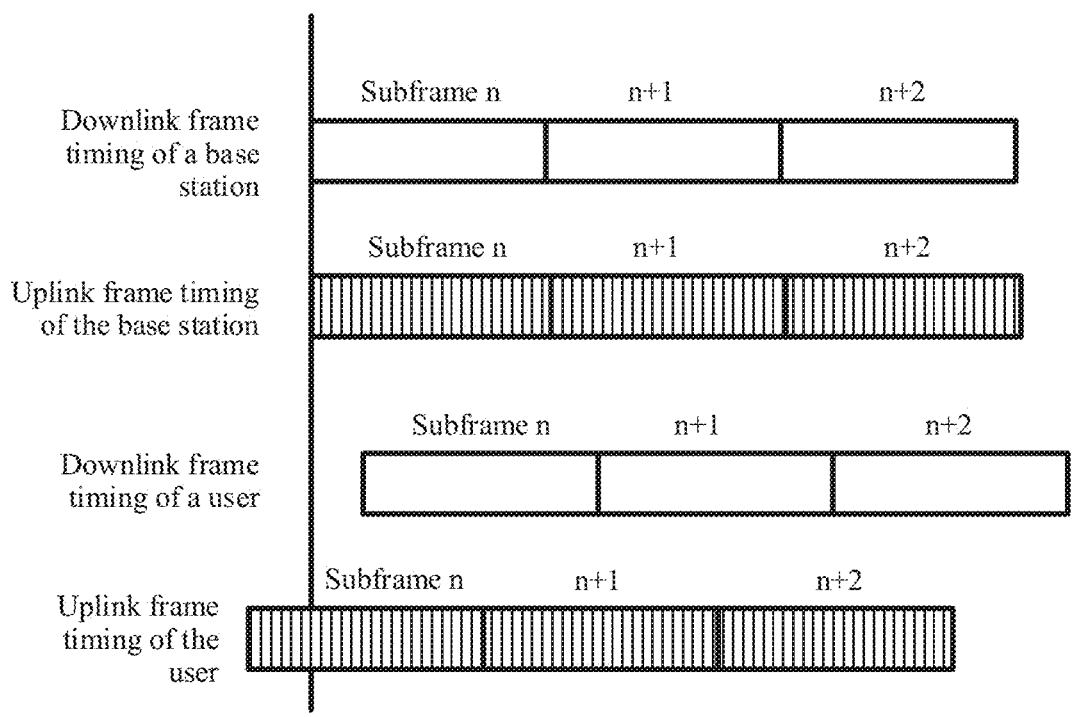
FIG. 3 is a schematic diagram of a timing relationship between a base station and user equipment according to an embodiment of this application.

FIG. 3 is a schematic diagram of a timing relationship between a base station and user equipment according to an embodiment of this application. As shown in the figure, in a terrestrial cellular LTE system, a transmission delay value between a base station and UE is generally less than a subframe length, and there is a certain deviation between the downlink frame timing of the base station and downlink frame timing of a user in absolute time.

In uplink transmission in the LIT system, different UEs perform orthogonal multiple access in time and frequency. To ensure orthogonality of uplink transmission, the base station requires that signals from different UEs in a same subframe arrive at the base station at basically aligned time. To meet this requirement, uplink frame timing on the UE side has a certain advance compared with the downlink frame timing on a user side, and a size of the timing advance is related to a transmission delay. In addition, the downlink frame timing on the base station side is aligned with uplink frame timing on the base station side.

Figure 4:
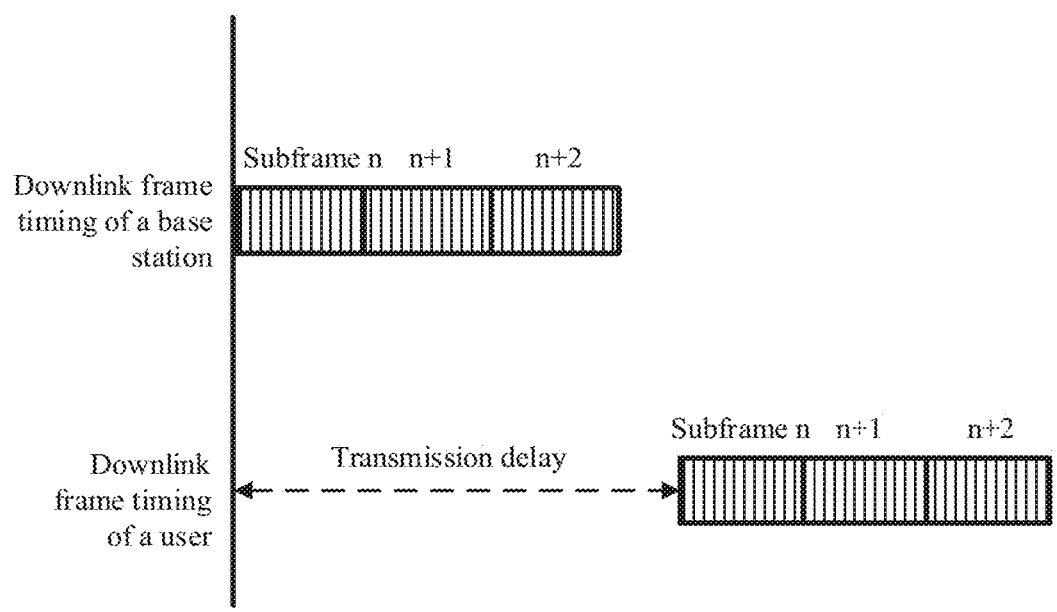
FIG. 4 is a schematic diagram of a transmission delay relationship between a base station and user equipment according to an embodiment of this application.

FIG. 4 is a schematic diagram of a transmission delay relationship between a base station and user equipment according to an embodiment of this application. As shown in the figure, in a large transmission delay scenario, for example, in a satellite communication scenario, a transmission delay may be greater than a subframe length. Consequently, in absolute time, the difference between the downlink frame timing on the base station side and the downlink frame timing on the UE side is greater than the subframe length.

Figure 5:
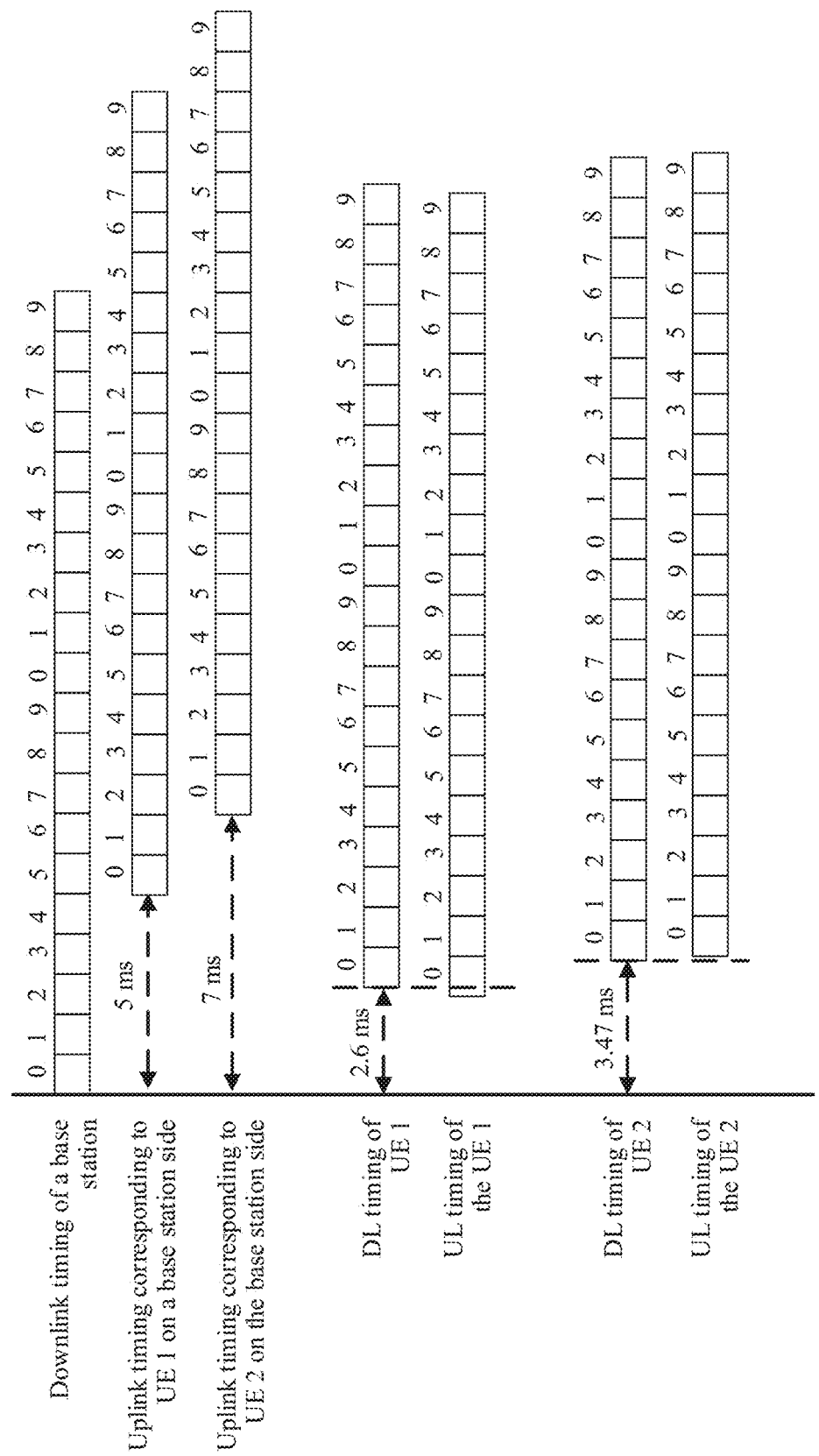
FIG. 5 is a schematic diagram of a baseline value of user equipment according to an embodiment of this application.

To reduce signaling overheads for notifying the timing advance, in a large delay scenario, the timing advance is determined by the baseline value and a transmission delay, and a deviation between uplink frame timing on the UE side and the downlink frame timing on the UE side is the timing advance. Different from a terrestrial cellular system, in the large delay scenario, uplink frame timing on the base station side is not aligned with the downlink frame timing on the base station side. A specific deviation is related to the baseline value. In addition, because baseline values are different, uplink frame timing corresponding to different users on the base station side is different. For ease of understanding, refer to FIG. 5. FIG. 5 is a schematic diagram of a baseline value of user equipment according to an embodiment of this application. As shown in the figure, for UE 1, uplink timing that is of a base station and that is relative to the UE 1 is 5 milliseconds (ms) later than downlink timing that is of the base station and that is relative to the UE 1. Therefore, 5 ms may be used as a baseline value of the UE 1. For UE 2, uplink timing that is of the base station and that is relative to the UE 2 is 7 ms later than downlink timing that is of the base station and that is relative to the UE 2. Therefore, 7 ms may be used as a baseline value of the UE 2. In the figure, 2.6 ms represents a transmission delay of the UE 1, and 3.47 ms represents a transmission delay of the UE 2.

A process of obtaining the baseline value by the base station is specifically as follows: First, the base station obtains a satellite type of a target satellite, where the target satellite is a satellite that communicates with the UE, and then, the base station may determine the baseline value based on the satellite type of the target satellite.

The satellite type includes a satellite altitude and an on-board processing capability. Based on the altitude, target satellites can be classified into a low earth orbit satellite, a medium earth orbit satellite and a geosynchronous orbit satellite. Based on the on-board processing capability, target satellites can be classified into a satellite with an on-board processing capability and a satellite with a bent-pipe forwarding capability (that is, a satellite without the on-board processing capability).

For ease of understanding, refer to Table 1. Using a geosynchronous orbit satellite as an example, Table 1 shows a relationship between the baseline value and a satellite having the on-board processing capability, and a relationship between the baseline value and a satellite having the bent-pipe forwarding capability.

TABLE 1

| Satellite type | Value range of a baseline value |
| --- | --- |
| On-board processing capability | 120 ms to 135 ms |
| Bent-pipe forwarding capability | 240 ms to 270 ms |

It should be noted that Table 1 is only an example of a relationship between the satellite type and the baseline value. In an actual application, the value range of the baseline value may be further adjusted based on the satellite altitude and the on-board processing capability.

Optionally, when UEs in a same cell (or beam range) use a same baseline value, the base station may send a broadcast message to the UEs in the same cell (or beam range), that is, the baseline value is carried in the broadcast message. The broadcast information includes but is not limited to a master information block (MIB), system information (SI), and other SI. A possible manner of notifying the baseline value is:

```
-ASN1 START
    SysterInformationBlock-SL::=    SEQUENCE{
        sl-Bandwidth-r15
        directFrameNumber-r15
        Tbase                       interger(0, 7, 10, 120, 130,
240, 260)
    }
- ASN1STOP
``` where Tbase represents the baseline value, and 7 represents seven time units. If the time unit is a subframe, and a time length of each subframe is 1 ms, the baseline value is 7 ms.

Optionally, when UEs in a same cell (or beam range) use different baseline values, the base station may send at least one of downlink control information (DCI), group DCI, radio resource control (RRC) information, and a medium access control (MAC) control element (CE) to the UEs in the same cell (or beam range). That is, the baseline value is carried in the DCI, the group DCI, the RRC information, or the MAC CE. The base station side sets a baseline value for each UE, and subsequent adjustment of a timing advance of each UE is based on the baseline value.

The DCI is UE-specific, and each UE receives one piece of DCI. The group DCI is used to notify UEs in a group. A group of UEs have one same piece of DCI, and one cell may be divided into a plurality of groups.

102. The base station determines the timing advance based on the baseline value and the transmission delay value, where the transmission delay value indicates a propagation delay of data transmission between the base station and the UE.

Figure 6:
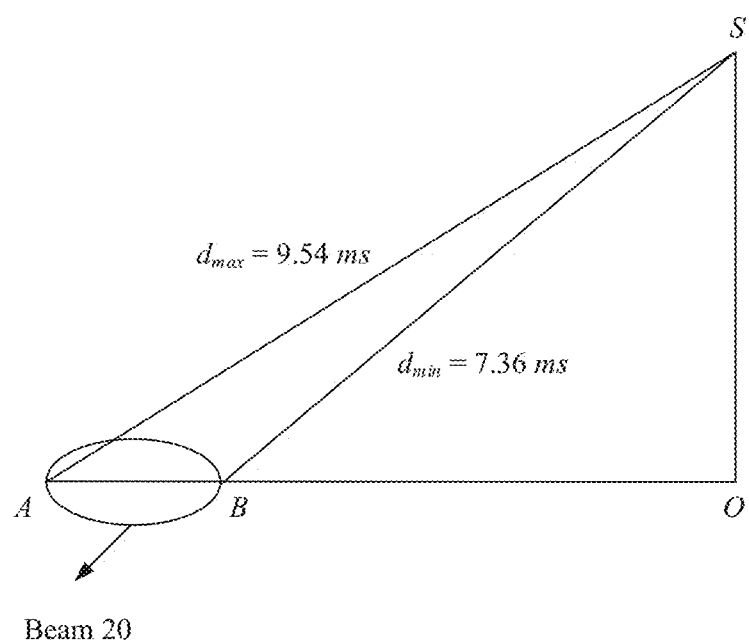
FIG. 6 is a schematic diagram of coverage of a beam in satellite mobile communication according to an embodiment of this application.

In this embodiment, the base station obtains a delay of data transmission between the base station and the UE through measurement, that is, obtains the transmission delay value. However, UEs in one cell or in one beam range may have different transmission delay values. For ease of understanding, refer to FIG. 6. FIG. 6 is a schematic diagram of coverage of a beam in satellite mobile communication according to an embodiment of this application. An iridium system is used as an example, and a beam numbered 20 is shown in FIG. 6. A satellite altitude is 780 kilometers, and corresponds to a distance between S and O in FIG. 6. A transmission time for a closest point is 7.36 ms, that is, a transmission time between S and B in FIG. 6 is 7.36 ms. A transmission time for a farthest point is 9.54 ms, that is, a transmission time between S and A in FIG. 6 is 9.54 ms.

Next, the base station may calculate a tinting advance corresponding to the UE by using the measured transmission delay value and the baseline value. In this case, a baseline value in a cell (or beam range) may be 7 ms, where 7 ms is obtained by rounding down a minimum one-way transmission delay 7.36 ms. It is easy to learn that the baseline value is related to the satellite altitude and a satellite beam direction. A first optional formula for calculating the timing advance may be:

TA=2×(Delay−Tbase), where

TA represents the timing advance, Delay represents the transmission delay value, and Tbase represents the baseline value.

Still using FIG. 6 as an example, at the closest point (B), the timing advance of the UE is:

2×(7.36−7)=0.72 ms.

At the farthest point (A), the timing advance of the UE is:

2×(9.54−7)=5.08 ms.

Optionally, if a baseline value in a cell (or beam range) is 14 ms, similarly, the baseline value is also related to the satellite altitude and the satellite beam direction. A second optional formula for calculating the timing advance may be:

TA=2×Delay−Tbase, where

TA represents the timing advance, Delay represents the transmission delay value, and Tbase represents the baseline value.

Still using FIG. 6 as an example, at the closest point (B), the timing advance of the UE is:

2×7.36−14=0.72 ms.

At the farthest point (A), the timing advance of the UE is:

2×9.54−14=5.08 ms.

In the second optional formula for calculating the timing advance, calculation is performed by using an example in which Tbase is 14 ms. It should be noted that Tbase may alternatively be a value between 14 ms and 20 ms, and the value is equal to an integer multiple of a subframe.

It may be understood that, in an actual application, other formulas may be used to calculate the timing advance. Certainly, these formulas involve the transmission delay value and the baseline value. The second calculation formula may be used to further reduce overheads of the timing advance. In addition, the foregoing methods for calculating the timing advance are performed based on a case in which baseline values in an entire cell (or beam range) are the same. In most cases, different baseline values may be set for different UEs, and a corresponding timing advance is calculated by using a baseline value corresponding to each UE.

103. The base station sends the timing advance to the UE.

In this embodiment, after calculating the timing advance of the UE, the base station may deliver the timing advance to the UE. It is assumed that there are five UEs in total in a cell (or beam range). Regardless of whether the five UEs use a same baseline value or use different baseline values, the base station calculates a timing advance for each UE. After completing the calculation, the timing advances corresponding to the five UEs are notified.

104. The UE sends the uplink data by using the timing advance.

In this embodiment, after calculating the timing advance, the UE determines a difference between the uplink frame timing and the downlink frame timing on the UE side based on the timing advance, and sends the uplink data to the base station based on the uplink timing on the UE side.

It may be understood that the UE may send the uplink data to the base station by using a physical uplink shared channel (PUSCH), a random access channel (RACH), a physical uplink control channel PUCCH, a sounding reference signal SRS, a demodulation reference signal DMRS, or the like, or may send the uplink data to the base station by using another channel. This is not limited herein.

In this embodiment of this application, the data transmission method is provided. First, the base station obtains the baseline value, where the baseline value is used to indicate the difference between the downlink frame timing of the base station and the uplink frame timing of the base station, the baseline value is used to determine the timing advance, and the timing advance is used to send the uplink data. Then, the base station receives the uplink data. In the foregoing manner, in a large transmission delay scenario, a value range of a timing advance calculated by using a baseline value is definitely smaller than a value range of a transmission delay value. Therefore, overheads of the timing advance can be effectively reduced.

Figure 7:
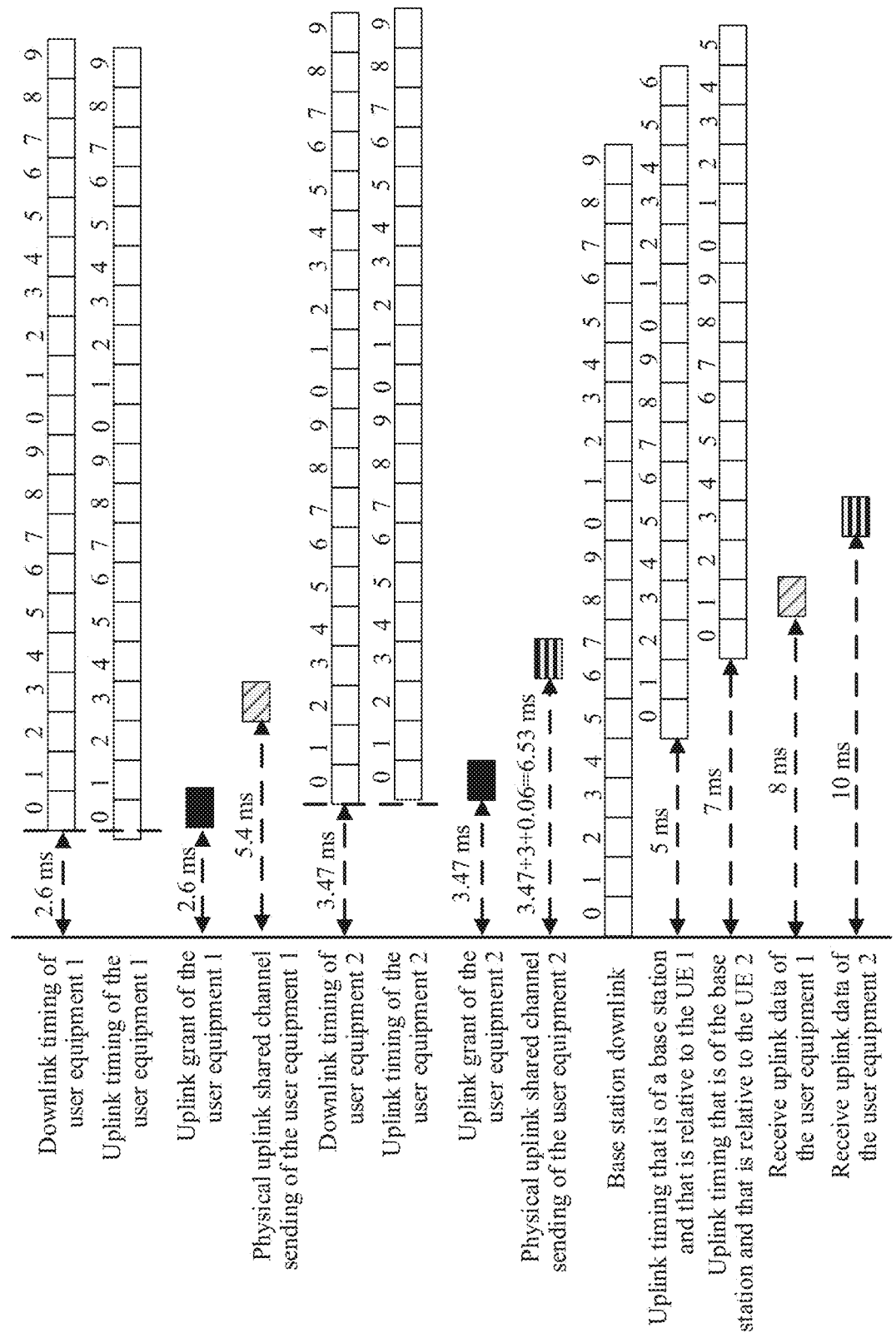
FIG. 7 is a schematic diagram of an embodiment of a data transmission method in an application scenario of this application.

For ease of understanding, the following describes a data transmission method in this application in detail by using a specific application scenario. FIG. 7 is a schematic diagram of an embodiment of a data transmission method in an application scenario of this application. Details are as follows:

As shown in the figure, it is assumed that a subframe length is 1 ms, and UE 1 and UE 2 are in a same cell. It is assumed that in a current scenario, uplink timing of the UE is not aligned with downlink timing of the UE, which generates a timing advance. K2=3 ms, and K2 indicates a time interval between a moment at which the UE receives uplink scheduling information and a moment at which the UE sends uplink data.

For the time interval between sending of the uplink data and receiving of the scheduling information, it is assumed that values of K2 configured for the UE 1 and the UE 2 are the same, a transmission delay value of the UE 1 is 2.6 ms, and a transmission delay value of the UE 2 is 3.47 ms.

The base station separately calculates timing advances of the UE 1 and the UE 2 by using the following formula:

$$TA\_temp=\min[abs(2\times Delay-Tbase1),abs(2\times Delay-Tbase2)]=\min[abs(2\times Delay-floor(2\times Delay)),abs(2\times Delay-ceil(2\times Delay))], \text{ where}$$

min( ) represents that a minimum value is taken, abs( ) represents that an absolute value is taken, floor( ) represents rounding down, ceil( ) represents rounding up, Delay represents the transmission delay value, Tbase1 represents a baseline value obtained by rounding down, and Tbase2 represents a baseline value obtained by rounding up.

First, the base station separately calculates baseline values of the UE 1 and the UE 2.

For the UE 1, Tbase1 and Tbase2 are calculated as follows:

$$Tbase1(UE1)=floor(2\times Delay)=floor(2\times 2.6 \text{ ms})=5 \text{ ms}$$

$$Tbase2(UE1)=floor(2\times Delay)=floor(2\times 2.6 \text{ ms})=6 \text{ ms}$$

Then, the timing advance of the UE 1 is calculated.

That is, TA_temp(UE1)=min[abs(2×2.6 ms−5 ms)), abs(2×2.6 ms−6 ms))]=min(0.2 ms, 0.8 ms)

0.2 ms<0.8 ms. Therefore, the baseline value Tbase1 is 5 ms.

Therefore, TA(UE1)=2×Delay−Tbase1=0.2 ms, that is, the timing advance of the UE 1 is 0.2 ms, and 0.2 ms indicates a 0.2 ms advance.

For the UE 2, Tbase1 and Tbase2 are calculated as follows:

$$Tbase1(UE2)=floor(2\times Delay)=floor(2\times 3.47 \text{ ms})=6 \text{ ms}$$

$$Tbase2(UE2)=floor(2\times Delay)=ceil(2\times 3.47 \text{ ms})=7 \text{ ms}$$

Then, the timing advance of the UE 2 is calculated.

That is, TA_temp(UE2)=min[abs(2×3.47 ms−6 ms)), abs(2×3.47 ms−7 ms))]=min(0.94 ms, 0.06 ms)

0.06 ms<0.94 ms. Therefore, the baseline value Tbase2 is 7 ms.

The reason why the minimum value is selected when the timing advance is determined is that a smaller range of the timing advance indicates a smaller quantity of bits used for notifying the timing advance, thereby reducing signaling overheads.

Therefore, TA(UE2)=2×(Delay−Tbase2=−0.06 ms, that is, the timing advance of the UE 2 is −0.06 ms, where −0.06 ms indicates that the uplink frame timing of the UE is 0.06 ms later than the downlink frame timing of the UE.

Figure 8:
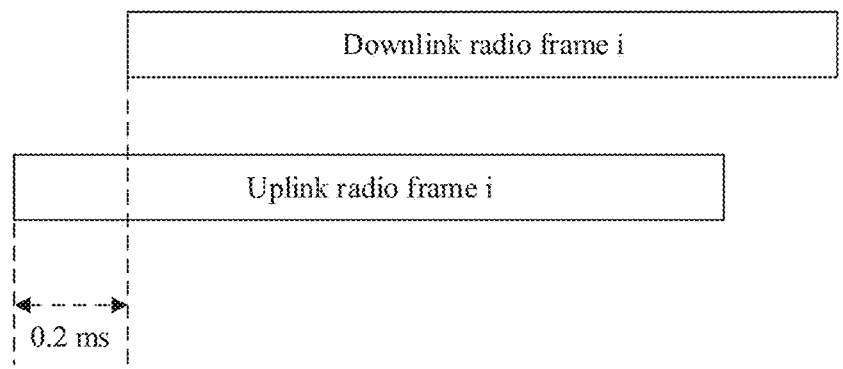
FIG. 8 is a schematic diagram of uplink frame timing and downlink frame timing of user equipment 1 in an application scenario of this application.
Figure 9:
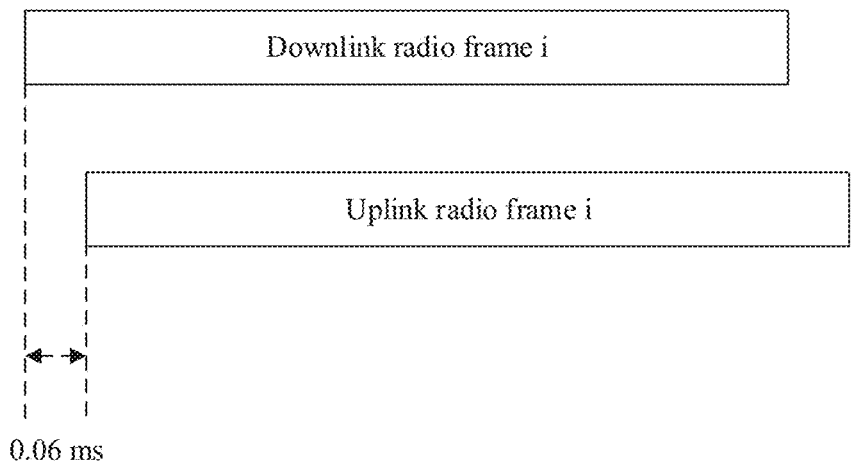
FIG. 9 is a schematic diagram of uplink frame timing and downlink frame timing of user equipment 2 in an application scenario of this application.

Therefore, the base station may determine that a difference between uplink frame timing of the UE 1 and downlink frame timing of the UE 1 is 0.2 ms, and a difference between the uplink frame timing of the UE 2 and the downlink frame timing of the UE 2 is −0.06 ms, FIG. 8 is a schematic diagram of uplink frame timing and downlink frame timing of user equipment 1 in an application scenario of this application. FIG. 9 is a schematic diagram of uplink frame timing and downlink frame timing of user equipment 2 in an application scenario of this application. As shown in FIG. 8 and FIG. 9, both the UE 1 and the UE 2 first receive scheduling information a downlink frame, and send uplink data to the base station only after receiving the scheduling information. Compared with a downlink subframe 0 on the base station side, a downlink subframe 0 on a UE 1 side is delayed by 2.6 ms in absolute time. It is assumed that the base station sends downlink scheduling information of the UE 1 in the downlink subframe 0. The UE 1 receives the downlink scheduling information in the downlink subframe 0 of the UE 1, and the downlink subframe 0 of the UE 1 is 2.6 ms later than the downlink subframe 0 on the base station side in absolute time. It is assumed that values of K2 configured for the UE 1 and the UE 2 are the same, where K2=3 ms. Because K2=3 ms, and TA(UE1)=0.2 ms, it can be determined that an absolute time difference between the downlink subframe 0 on the base station side and a moment at which the UE 1 sends uplink data on a PUSCH, that is, an uplink subframe 3 in which the UE 1 side sends the uplink data is as follows:

TIME(UE1)=2.6 ms+3 ms−0.2 ms=5.4 ms

Similarly, compared with the downlink subframe 0 on the base station side, downlink subframe 0 on a UE 2 side is delayed by 3.47 ms in absolute time, and scheduling information is received in the downlink frame 0 corresponding to the UE 2. Because K2=3 ms, and TA(UE2)=0.06 ms, it can be determined that an absolute time difference between a moment at which the UE 2 sends uplink data on a PUSCH and the downlink subframe 0 on the base station side is as follows:

TIME(UE2)=3.47 ms+3 ms+0.06 ms=6.53 ms

As shown in FIG. 7, because the base station sends downlink scheduling information to the UE 1 and the UE 2 in the downlink subframe 0, K2 configured for the UE 1 is 3 ms, and K2 configured for the UE 2 is 3 ms, the UE 1 sends uplink data in the uplink subframe 3 on the UE 1 side, the UE 2 sends uplink data in an uplink subframe 3 on the UE 2 side, and the base station receives the uplink data from the UE 1 in an uplink subframe 3 of the base station in uplink frame timing that is of the base station and that is relative to the UE 1, and receives the uplink data from the UE 2 in an uplink subframe 3 of the base station in uplink frame timing that is of the base station and that is relative to the UE 2. As shown in FIG. 7, uplink timing on the base station side is not aligned with downlink timing on the base station side. For the UE 1, the uplink frame tinting on the base station side is 5 milliseconds later than downlink frame timing on the base station side. For the UE 2, the uplink frame timing on the base station side is 7 ms later than the downlink frame timing on the base station side. Because both the UE 1 and the UE 2 transmit the uplink data in the uplink subframe 3, the base station receives the uplink data in the uplink subframe 3 in the uplink timing that is relative to the UE 1. In this case, an absolute time difference between the moment at which the base station receives the data and the downlink subframe 0 of the base station is 8 ms (3 ms+5 ms=8 ms). The base station receives the uplink data in the uplink subframe 3 in the uplink timing that is relative to the UE 2. In this case, an absolute time difference between the moment at which the base station receives the data and the downlink subframe 0 of the base station is 10 ms (3 ms+7 ms=10 ms).

It may be understood that, in a current protocol, the timing advance IA may be a positive value or a negative value.

Figure 10:
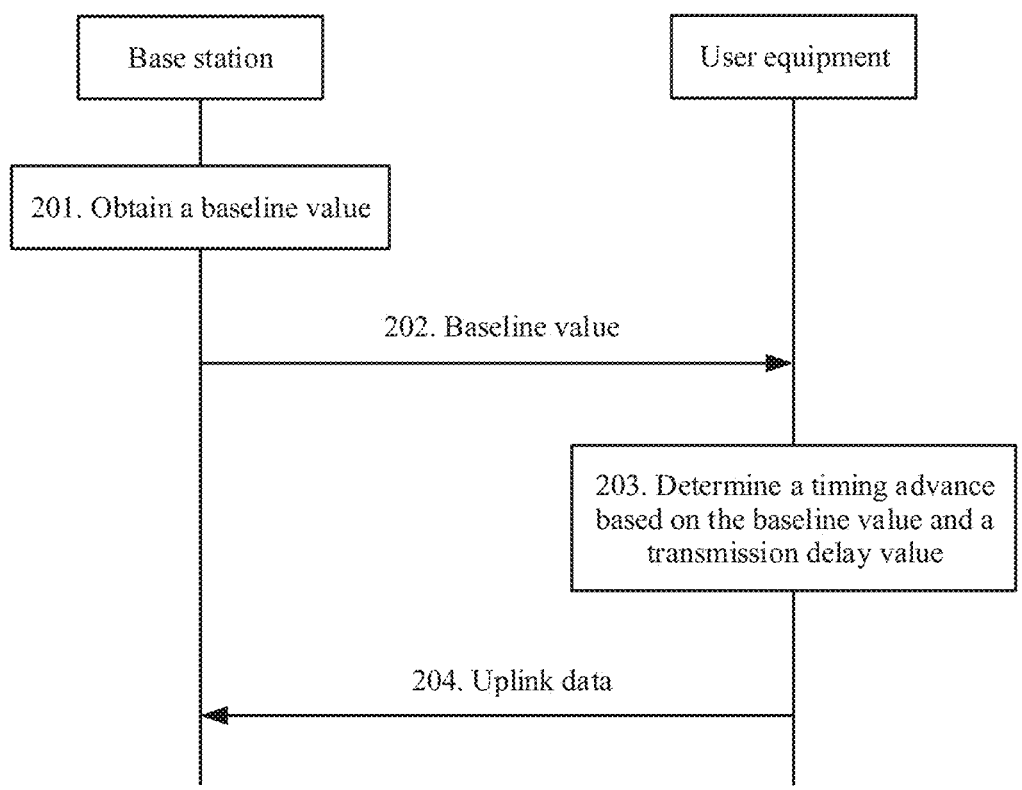
FIG. 10 is a schematic diagram of another embodiment of a data transmission method according to the embodiments of this application.

Embodiment 2: UE Determines a Timing Advance Based on a Baseline Value Sent by a Base Station FIG. 10 is a schematic diagram of an embodiment of a data transmission method according to the embodiments of this application. The data transmission method is applied to a data transmission system. The data transmission system includes a base station and UE. This embodiment of the data transmission method in the embodiments of this application includes the following steps.

201. The base station obtains a baseline value, where the baseline value is used to indicate a time interval between downlink frame timing and uplink frame timing, the baseline value is used to determine a timing advance, and the timing advance is used to send uplink data.

In this embodiment, a manner of obtaining the baseline value by the base station is the same as the content described in step 101 in Embodiment 1. Therefore, details are not described herein again.

202. The base station sends the baseline value to the UE.

In this embodiment, after obtaining the baseline value, the base station needs to send the baseline value to UEs in a cell (or beam range). It may be understood that the UEs in the cell (or beam range) may use a same baseline value, or different UEs may use different baseline values.

Optionally, when UEs in a same cell (or beam range) use a same baseline value, the base station may send a broadcast message to the UEs in the same cell (or beam range), that is, the baseline value is carried in the broadcast message. The broadcast information includes but is not limited to an MIB, SI, and other SI. A possible manner of notifying the baseline value is:

```
-ASN1START
    SysterInformationBlock-SL::=    SEQUENCE{
        sl-Bandwidth-r15
        directFrameNumber-r15
        Tbase                        interger(0, 7, 10, 120, 130, 240, 260)
    }
- ASN1STOP
``` where Tbase represents the baseline value, and 7 represents seven time units. If the time unit is a subframe, and a length of each subframe is 1 ms, the baseline value is 7 ms.

Optionally, when UEs in a same cell (or beam range) use different baseline values, the base station may send at least one of DCI, group DCI, RRC information, or a MAC CE to the UEs in the same cell (or beam range). That is, the baseline value is carried in the DCI, the group DCI, the RRC information, or the MAC CE. The base station side sets a baseline value for each UE, and subsequent adjustment of a timing advance of each UE is based on the baseline value.

The DCI is UE specific, and each UE receives one piece of DCI. The group DCI is used to notify UEs in a group. A group of UEs have one same piece of DCI, and one cell may be divided into a plurality of groups.

It may be understood that if all UEs in a cell (or beam range) use one baseline value, notification is performed through broadcasting. If UEs in a cell (or beam range) use different baseline values, downlink control indication information is used for notification. Specifically, if UEs in a cell (or beam range) are grouped into n groups, baseline values of different groups may be notified by using group DCI.

203. The UE determines the timing advance based on the baseline value and a transmission delay value, where the transmission delay value indicates a propagation delay of data transmission between the base station and the UE.

In this embodiment, the UE obtains the delay of data transmission between the base station and the UE through measurement, that is, obtains the transmission delay value. For ease of understanding, still refer to FIG. 6. FIG. 6 is a schematic diagram of coverage of a beam in satellite mobile communication according to an embodiment of this application. An iridium system is used as an example, and a beam numbered 20 is shown in FIG. 6. A satellite altitude is 780 kilometers, and corresponds to a distance between S and O in FIG. 6. A transmission time for a closest point is 7.36 ms, that is, a transmission time between S and B in FIG. 6 is 7.36 ms. A transmission time for a farthest point is 9.54 ms, that is, a transmission time between S and A in FIG. 6 is 9.54 ms.

In this case, baseline values of different UEs in a cell (or beam range) may be different values. Certainly, the baseline value is still related to a satellite height and a satellite beam direction.

Specifically, the baseline value may be calculated by using the following formula:

$$T\text{base} = \text{floor}(2 \times \text{Delay}), \text{ where}$$

floor( ) represents rounding down, Delay represents the transmission delay value, and Tbase represents the baseline value.

Still using FIG. 6 as an example, at the closest point (B), the baseline value of the UE is:

$$\begin{aligned} T\text{base} &= \text{floor}(2 \times \text{Delay}); \\ &= \text{floor}(7.36 \text{ ms} \times 2) = 14 \text{ ms} \end{aligned}$$

At the farthest point (A), the baseline value of the UE is:

$$\begin{aligned} T\text{base} &= \text{floor}(2 \times \text{Delay}); \\ &= \text{floor}(9.54 \text{ ms} \times 2) = 19 \text{ ms} \end{aligned}$$

Next, the base station may calculate a tinting advance corresponding to the UE by using the measured transmission delay value and the baseline value. A first optional formula for calculating the tuning advance may be:

TA==2×Delay−Tbase, where

TA represents the timing advance, Delay represents the transmission delay value, and Tbase represents the baseline value.

Still using FIG. 6 as an example, at the closest point (B), the timing advance of the UE is:

2×7.36−14=0.72 ms.

At the farthest point (A), the timing advance of the UE is:

2×9.54−19=0.08 ms.

It may be understood that, in an actual application, other formulas may be used to calculate the timing advance. Certainly, these formulas involve the transmission delay value and the baseline value.

204. The UE sends the uplink data by using the timing advance.

In this embodiment, after the UE calculates the timing advance, the UE determines a difference between uplink timing and downlink timing on a UE side based on the timing advance, and the UE sends the uplink data based on uplink frame timing on the UE side. A manner of sending the uplink data by the UE is the same as the content described in step 104 in Embodiment 1. Therefore, details are not described herein again.

In this embodiment of this application, the data transmission method is provided. First, the base station obtains the baseline value, where the baseline value is used to indicate a difference between downlink frame timing of the base station and uplink frame timing of the base station. The baseline value is used to determine the timing advance, and the timing advance is used to determine a relationship between the uplink frame timing and the downlink frame timing on the UE side. The UE sends the uplink data based on the uplink frame timing, and then the base station receives the uplink data. In the foregoing manner, in a large transmission delay scenario, a value range of a timing advance calculated by using a baseline value is definitely smaller than a value range of a transmission delay value. Therefore, overheads of the timing advance can be effectively reduced.

Figure 11:
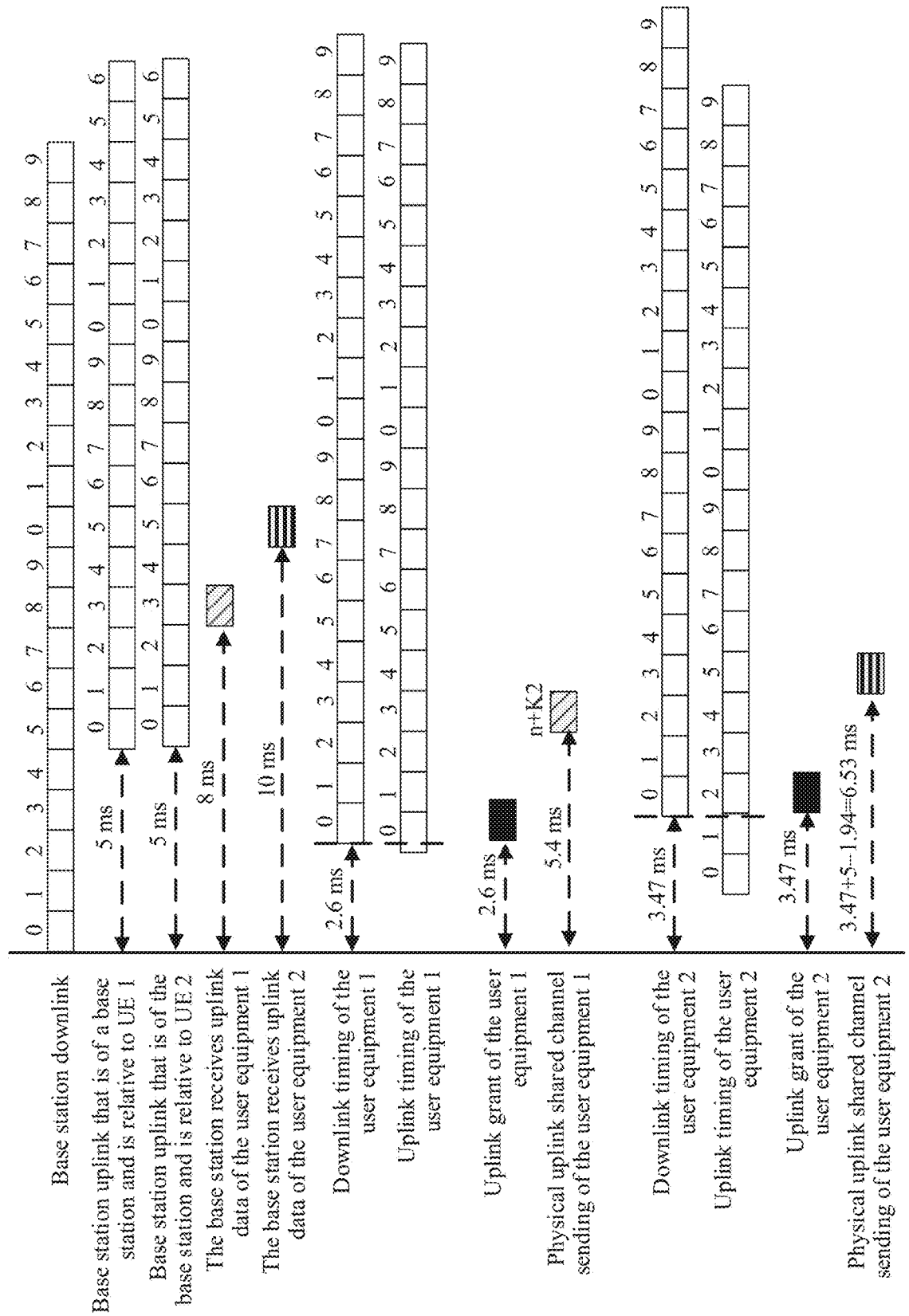
FIG. 11 is a schematic diagram of another embodiment of a data transmission method in an application scenario of this application.

For ease of understanding, the following describes another data transmission method in this application in detail by using a specific application scenario. FIG. 11 is a schematic diagram of another embodiment of a data transmission method in an application scenario of this application. Details are as follows:

As shown in the figure, both an uplink frame received by the base station and a downlink frame sent by the base station are 1 ms frames. It is assumed that in a current scenario, uplink timing of the UE is not aligned with downlink timing of the UE, which generates a timing advance. K2=3 ms, and K2 indicates a time interval between a moment at which the UE receives uplink scheduling information and a moment at which the UE sends uplink data. A transmission delay value of UE 1 is 2.6 ms, and a transmission delay value of UE 2 is 3.47 ms.

It is assumed that the base station sets the baseline value to 5 ms. Then, the base station notifies the baseline value to the UE 1 and the UE 2 in a cell, and the UE 1 and the UE 2 calculate timing advances corresponding to the UE 1 and the UE 2. A used formula for calculating the timing advance is as follows:

TA=2×Delay−Tbase.

Therefore, the timing advance of the UE 1 is:

$$TA(UE\ 1) = 2 \times \text{Delay} - Tbase;$$
$$= 2 \times 2.6\ \text{ms} - 5\ \text{ms} = 0.2\ \text{ms}$$

The timing advance of the UE 2 is:

$$TA(UE\ 2) = 2 \times \text{Delay} - Tbase;$$
$$= 2 \times 3.47\ \text{ms} - 5\ \text{ms} = 1.94\ \text{ms}$$

Therefore, uplink frame timing of the UE 1 is 0.2 ms earlier than downlink frame timing of the UE 1, and uplink frame timing of the UE 2 is 1.94 ms earlier than downlink frame timing of the UE 2. Both the UE 1 and the UE 2 first receive scheduling information in a downlink frame, and send uplink data to the base station only after receiving the scheduling information. Compared with a downlink subframe 0 on the base station side, a downlink subframe 0 on a UE 1 side is delayed by 2.6 ms in absolute time. It is assumed that the base station sends downlink scheduling information of the UE 1 in the downlink subframe 0. The UE 1 receives the downlink scheduling information in the downlink subframe 0 of the UE 1, and the downlink subframe 0 of the UE 1 is 2.6 ms later than the downlink subframe 0 on the base station side in absolute time. It is assumed that K2 configured for the UE 1 is 3 ms, TA(UE1)= 0.2 ms. Therefore, it can be determined that an absolute time difference between a moment at which the UE 1 sends uplink data on a PUSCH and the downlink subframe 0 on the base station side is as follows:

TIME(UE1)=2.6 ms+3 ms−0.2 ms=5.4 ms

Similarly, for the UE 2, compared with the downlink subframe 0 on the base station side, a downlink subframe 0 of the UE 2 is delayed by 3.47 ms in absolute time. It is assumed that K2 configured for the UE 2 is 5 ms, and TA(UE2)=1.94 ms. Therefore, it can be determined that an absolute time difference between a moment at which the UE 2 sends uplink data on the PUSCH and the downlink subframe 0 on the base station side is as follows:

TIME(UE2)=3.47 ms+5 ms−1.94 ms=6.53 ms

As shown in FIG. 11, because the base station sends downlink scheduling information to the UE 1 and the UE 2 in the downlink subframe 0, K2 configured for the UE 1 is 3 ms, and K2 configured for the UE 2 is 5 ms, the UE 1 sends uplink data in an uplink subframe 3 on the UE 1 side, the UE 2 sends uplink data in an uplink subframe 5 on the UE 2 side, and the base station receives the uplink data from the UE 1 in an uplink subframe 3 of the base station that is in uplink frame timing that is of the base station and that is relative to the UE 1, and receives the uplink data from the UE 2 in an uplink subframe 5 of the base station in uplink frame timing that is of the base station and that is relative to the UE 2. As shown in FIG. 11, uplink timing on the base station side is not aligned with downlink timing on the base station side. For all users, the uplink frame timing on the base station side is 5 milliseconds later than the downlink frame timing on the base station side.

Embodiment 3: UE Determines a Baseline Value and a Timing Advance

Figure 12:
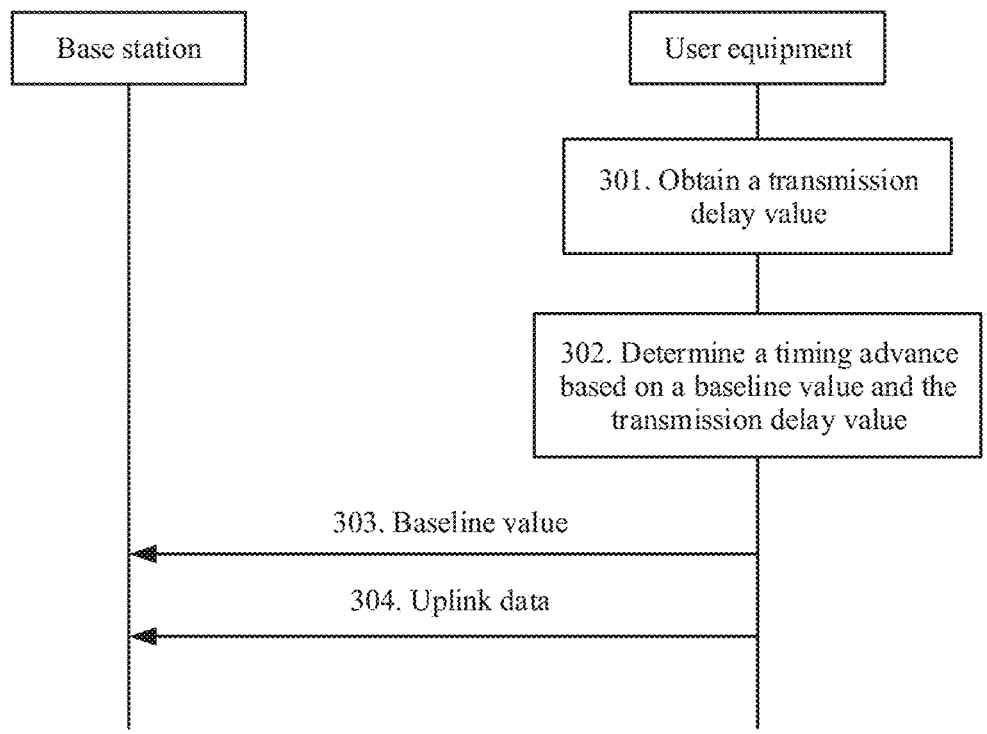
FIG. 12 is a schematic diagram of another embodiment of a data transmission method according to the embodiments of this application.

FIG. 12 is a schematic diagram of an embodiment of a data transmission method according to the embodiments of this application. The data transmission method is applied to a data transmission system. The data transmission system includes a base station and UE. This embodiment of the data transmission method in the embodiments of this application includes the following steps.

301. The UE obtains a transmission delay value, where the transmission delay value indicates a propagation delay of data transmission between the base station and the UE.

In this embodiment, the UE measures the transmission delay value between the UE and the base station. The transmission delay value indicates the propagation delay of the data transmission between the base station and the UE.

302. The UE determines a timing advance based on a baseline value and the transmission delay value, where the baseline value is used to indicate a time interval between downlink frame timing and uplink frame timing, the baseline value is used to determine the timing advance, and the timing advance is used to send uplink data.

In this embodiment, the UE may determine the timing advance based on the baseline value and the transmission delay value. A possible manner of calculating the timing advance is:

$$TA=2\times Delay-Tbase, \text{ where}$$

TA represents the tuning advance, Delay represents the transmission delay value, and Tbase represents the baseline value. The UE adjusts a data sending time based on the calculated timing advance, that is, $n^{th}$ uplink frame start timing on a UE side is one timing advance ahead of $n^{th}$ downlink frame timing on the UE side.

303. The UE sends the baseline value to the base station.

In this embodiment, the UE reports, to the base station, the baseline value used in a process of calculating the timing advance. The UE reports the baseline value to the base station in a plurality of manners, for example, by using a MAC CE or in a form of data, or in an uplink transmission process of random access. Specifically, in the random access process, reporting may be performed by using a random access preamble (RAP) or information (message, Msg) 3.

After receiving the baseline value sent by the UE, the base station may determine, based on the baseline value sent by the UE, a timing relationship between the base station and the UE, to further determine a receiving moment of the uplink data of a user.

304. The UE sends the uplink data by using the timing advance.

In this embodiment, after the UE calculates the timing advance, the UE determines a difference between uplink timing and downlink timing on the UE side based on the timing advance, and the UE sends the uplink data based on the uplink frame timing on the UE side. A manner of sending the uplink data by the UE is the same as the content described in step 104 in Embodiment 1. Therefore, details are not described herein again.

In this embodiment of this application, the data transmission method is provided. First, the UE obtains the baseline value, where the baseline value is used to indicate a difference between the downlink frame timing of the base station and the uplink frame timing of the base station, the baseline value is used to determine the timing advance, and the timing advance is used to send the uplink data. Then, the UE sends the uplink data by using the timing advance. In the foregoing manner, in a large transmission delay scenario, a value range of a timing advance calculated by using a baseline value is definitely smaller than a value range of a transmission delay value. Therefore, overheads of the timing advance can be effectively reduced.

For ease of understanding, the following describes another data transmission method in this application in detail by using a specific application scenario. FIG. 7 is a schematic diagram of an embodiment of a data transmission method in an application scenario of this application. Details are as follows:

As shown in the figure, it is assumed that a subframe length is 1 ms, and UE 1 and UE 2 are in a same cell. It is assumed that in a current scenario, there is a timing advance, K2=3 ms, and K2 indicates a time interval between a moment at which the UE sends uplink data and a moment at which the UE receives scheduling information. It is assumed that values of K2 configured for the UE 1 and the UE 2 are the same, a transmission delay value of the UE 1 is 2.6 ms, and a transmission delay value of the UE 2 is 3.47 ms.

The UE 1 and the UE 2 separately calculate timing advances corresponding to the UE 1 and the UE 2, and a used formula is in the following:

$$TA\_temp=min[abs(2\times Delay-Tbase1),abs(2\times Delay-Tbase2)]=min[abs(2\times Delay-floor(2\times Delay)),abs(2\times Delay-ceil(2\times(Delay))], \text{ where}$$

min( ) represents that a minimum value is taken, abs( ) represents that an absolute value is taken, floor( ) represents rounding down, ceil( ) represents rounding up, Delay represents the transmission delay value, Tbase1 represents a baseline value obtained by rounding down, and Tbase2 represents a baseline value obtained by rounding up.

First, the UE 1 and the UE 2 separately calculate baseline values corresponding to the UE 1 and the UE 2.

For the UE 1, Tbase1 and Tbase2 are calculated as follows:

$$Tbase1(UE1)=floor(2\times Delay)=floor(2\times 2.6 \text{ ms})=5 \text{ ms}$$

$$Tbase2(UE)=floor(2\times Delay)=floor(2\times 2.6 \text{ ms})=6 \text{ ms}$$

Then, the timing advances of the UE 1 and the UE 2 are calculated.

That is, TA_temp(UE1)=min[abs(2×2.6 ms−5 ms)), abs(2×2.6 ms−6 ms))]=min(0.2 ms, 0.8 ms)

0.2 ms<0.8 ms. Therefore, the baseline value Tbase1 is 5 ms.

Therefore, TA(UE1)=2×Delay−Tbase1=0.2 ms, that is, the timing advance of the UE 1 is 0.2 ms, and 0.2 ms indicates a 0.2 ms advance.

For the UE 2, Tbase1 and Tbase2 are calculated as follows:

$$Tbase1(UE2)=floor(2\times Delay)=floor(2\times 3.47 \text{ ms})=6 \text{ ms}$$

$$Tbase2(UE2)=floor(2\times Delay)=ceil(2\times 3.47 \text{ ms})=7 \text{ ms}$$

Then, the timing advance of the UE 2 is calculated.

That is, TA_temp(UE2)=min[abs(2×3.47 ms−6 ms)), abs(2×3.47 ms−7 ms))]=min(0.94 ms, 0.06 ms)

0.06 ms<0.94 ms. Therefore, the baseline value Tbase2 is 7 ms.

Therefore, TA(UE2)=2×Delay−Tbase2=−0.06 ms, that is, the timing advance of the UE2 is −0.06 ms.

The reason why the minimum value is selected when the timing advance is determined is that a smaller range of the timing advance indicates a smaller quantity of bits used for notifying the timing advance, thereby reducing signaling overheads.

Therefore, the base station may determine that a difference between uplink frame timing of the UE 1 and downlink frame timing of the UE 1 is 0.2 ms, and a difference between uplink frame timing of the UE 2 and downlink frame timing of the UE 2 is −0.06 ms. Both the UE 1 and the UE 2 first receive scheduling information in a downlink frame, and send uplink data to the base station only after receiving the scheduling information. Compared with a downlink subframe 0 on the base station side, a downlink subframe 0 on a UE 1 side is delayed by 2.6 ms in absolute time. It is assumed that the base station sends downlink scheduling information of the UE 1 on the downlink subframe 0. The UE 1 receives the downlink scheduling information in the downlink subframe 0 of the UE 1, and the downlink subframe 0 of the UE 1 is 2.6 ms later than the downlink subframe 0 on the base station side in absolute time. It is assumed that values of K2 configured for the UE 1 and the UE 2 are the same. Because K2=3 ms and TA(UE1)=0.2 ms, it can be determined that an absolute time difference between the downlink subframe 0 on the base station side and a moment at which the UE 1 sends uplink data on a PUSCH, that is, an uplink subframe 3 in which the UE 1 side sends the uplink data is as follows:

TIME(UE1)=2.6 ms+3 ms−0.2 ms=5.4 ms

Similarly, compared with the downlink subframe 0 on the base station side, downlink subframe 0 on a UE 2 side is delayed by 3.47 ms in absolute time, and scheduling information is received in the downlink frame 0 corresponding to the UE 2. Because K2=3 ms, and TA(UE2)=0.06 ms, it can be determined that an absolute time difference between a moment at which the UE 2 sends uplink data on a PUSCH and the downlink subframe 0 on the base station side is as follows:

TIME(UE2)=3.47 ms+3 ms+0.06 ms=6.53 ms

Assuming that the UE 1 sends uplink data to the base station in an uplink frame 3 on the UE 1 side, the base station receives the uplink data from the UE 1 in an uplink subframe 3 of the base station in uplink frame timing that is of the base station and that is relative to the UE 1. If the UE 2 sends uplink data to the base station in an uplink frame 3 on the UE 2 side, the base station receives the uplink data from the UE 2 in an uplink subframe 3 of the base station in uplink frame timing that is of the base station and that is relative to the UE 2. Because both the UE 1 and the UE 2 transmit the uplink data in the uplink subframe 3, the base station receives the uplink data in the uplink subframe 3 in the uplink timing that is relative to the UE 1. In this case, an absolute time difference between the moment at which the base station receives the data and the downlink subframe 0 of the base station is 8 ms (3 ms+5 ms=8 ms). The base station receives the uplink data in the uplink subframe 3 in the uplink timing that is relative to the LIE 2. In this case, an absolute time difference between the moment at which the base station receives the data and the downlink subframe 0 of the base station is 10 ms (3 ms+7 ms=10 ms).

Figure 13:
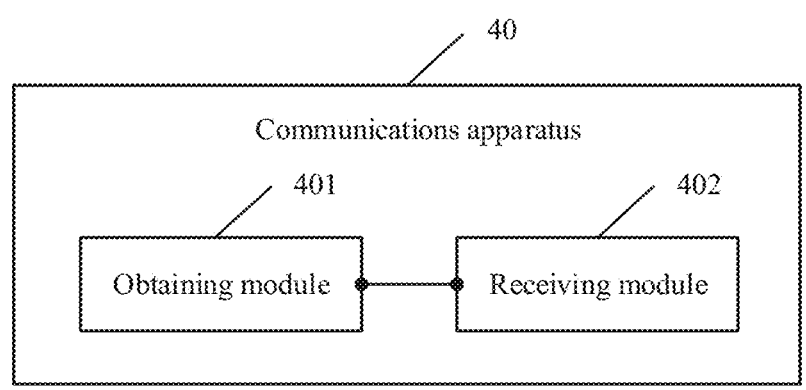
FIG. 13 is a schematic diagram of an embodiment of a base station according to the embodiments of this application.

The following describes in detail a communications apparatus corresponding to an embodiment of this application. The communications apparatus may be a base station, the communications apparatus is applied to a data transmission system, and the data transmission system further includes UE. Referring to FIG. 13, a communications apparatus 40 in an embodiment of this application includes:

an obtaining module 401, configured to obtain a baseline value, where the baseline value is used to indicate a time interval between downlink frame timing and uplink frame timing, the baseline value is used to determine a timing advance, and the timing advance is used to send uplink data; and a receiving module 402, configured to receive the uplink data.

In this embodiment, the obtaining module 401 obtains the baseline value, where the baseline value is used to indicate the time interval between the downlink frame timing and the uplink frame timing. The baseline value is used to determine the timing advance, and the timing advance is used to send the uplink data. The receiving module 402 receives the uplink data.

In this embodiment of this application, the communications apparatus is provided. First, the communications apparatus obtains the baseline value, where the baseline value is used to indicate a difference between the downlink frame timing of the base station and the uplink frame tinting of the base station. The baseline value is used to determine the tinting advance, and the timing advance is used to send the uplink data. Then, the base station receives the uplink data. According to the foregoing base station, in a large transmission delay scenario, a value range of a timing advance calculated by using a baseline value is definitely smaller than a value range of a transmission delay value. Therefore, overheads of the timing advance can be effectively reduced.

Optionally, based on the embodiment corresponding to FIG. 13, in another embodiment of the communications apparatus 40 provided in the embodiments of this application, the obtaining module 401 is specifically configured to obtain a satellite type of a target satellite, where the target satellite is a satellite that communicates with user equipment UE; and determine the baseline value based on the satellite type of the target satellite obtained by the obtaining unit.

In addition, in this embodiment of this application, in a process of obtaining the baseline value, the base station first needs to obtain the satellite type of the target satellite, and then determines the baseline value based on the satellite type of the target satellite. In the foregoing manner, it may be learned that the baseline value is associated with the satellite type, so that a closest baseline value may be determined based on different satellite types, thereby ensuring that the baseline value is more accurate.

Figure 14:
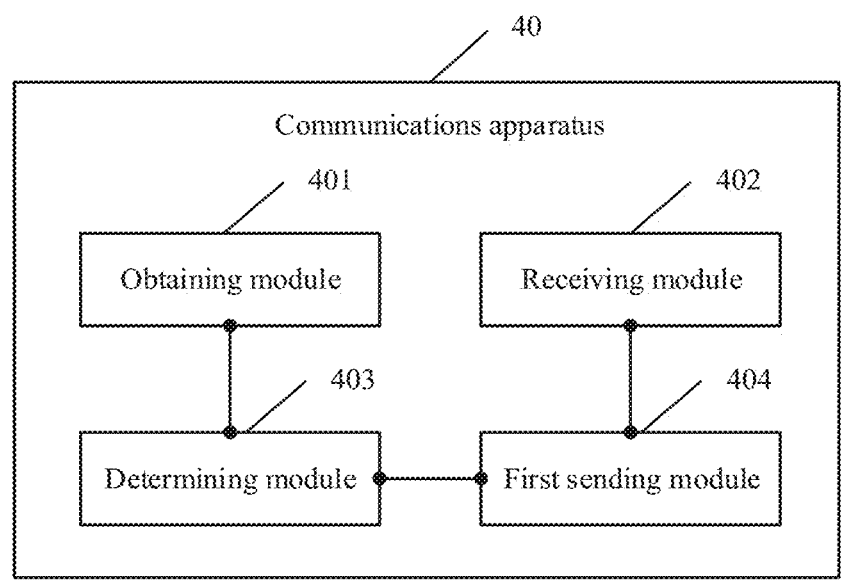
FIG. 14 is a schematic diagram of another embodiment of a base station according to the embodiments of this application.

Optionally, based on the embodiment corresponding to FIG. 13, in FIG. 14, in another embodiment of the communications apparatus 40 provided in the embodiments of this application, the communications apparatus 40 further includes:

a determining module 403, configured to determine the timing advance based on the baseline value and the transmission delay value, where the transmission delay value indicates a propagation delay of data transmission between the base station and the UE; and a sending module 404, configured to send, to the UE, the timing advance determined by the determining module 403.

In addition, in this embodiment of this application, the base station may calculate the tinting advance based on the baseline value and the transmission delay value, and then deliver the calculated timing advance to the UE, so that the UE sends the uplink data based on the corresponding timing advance. In the foregoing manner, the base station may actively determine the timing advance of the UE, where the value range of the timing advance is smaller than the value range of the transmission delay value, thereby reducing overheads of the timing advance. In this case, measurement of the timing advance on the base station side can reflect practicability and feasibility of the solution.

Optionally, based on the embodiment corresponding to FIG. 13 or FIG. 14, in another embodiment of the communications apparatus 40 provided in the embodiments of this application, the communications apparatus 40 further includes:

the sending module 404 is further configured to send the baseline value to the UE after the obtaining module 401 obtains the baseline value, where the baseline value is used to determine the timing advance of the UE.

In addition, in this embodiment of this application, after receiving the baseline value sent by the base station, the UE may calculate the timing advance based on the baseline value and the transmission delay value, and then send the uplink data based on the timing advance. In the foregoing manner, the UE may determine the timing advance, and the value range of the timing advance is smaller than the value range of the transmission delay value, thereby reducing overheads of the timing advance. In addition, the UE side measures the timing advance, reflecting flexibility and feasibility of the solution.

Optionally, based on the embodiment corresponding to FIG. 13 or 14, in another embodiment of the communications apparatus 40 provided in the embodiments of this application, the sending module 404 is specifically configured to send the baseline value to the UE by using at least one of a broadcast message, downlink control information DCI, group DCI, radio resource control RRC information, and a media access control MAC unit.

Further, in this embodiment of this application, the base station may further send the baseline value to the UE by using at least one of the broadcast message, the DCI, the group DCI, the RRC information, and the MAC CE. In the foregoing manner, the base station may simultaneously send the baseline values to all UEs in a cell, or may separately send the baseline value to each UE, so that the solution can be applied to different scenarios, thereby improving flexibility and practicability of the solution.

Figure 15:
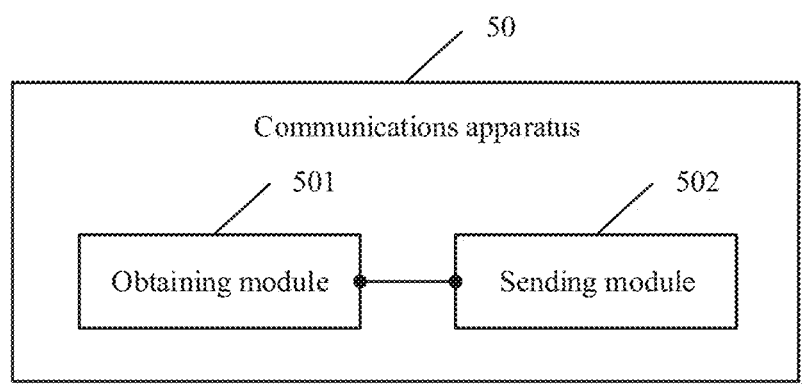
FIG. 15 is a schematic diagram of an embodiment of user equipment according to the embodiments of this application.

The foregoing has described the base station in this application. The following describes in detail a communications apparatus corresponding to an embodiment of this application. The communications apparatus may be UE. The UE is applied to a data transmission system. The data transmission system further includes a base station. In FIG. 15, a communications apparatus 50 in an embodiment of this application includes:

an obtaining module 501, configured to obtain a baseline value, where the baseline value is used to indicate a time interval between downlink frame timing and uplink frame timing, the baseline value is used to determine a timing advance, and the timing advance is used to send uplink data; and a sending module 502, configured to send the uplink data by using the timing advance.

In this embodiment, the obtaining module 501 obtains the baseline value, where the baseline value is used to indicate the time interval between the downlink frame timing and the uplink frame timing. The baseline value is used to determine the timing advance, and the timing advance is used to send the uplink data. The sending module 502 sends the uplink data by using the timing advance.

In this embodiment of this application, the communications apparatus is provided. First, the communications apparatus obtains the baseline value, where the baseline value is used to indicate a difference between the downlink frame timing of the base station and the uplink frame timing of the base station. The baseline value is used to determine the timing advance, the timing advance is used to send the uplink data. Then, the UE sends the uplink data by using the timing advance. According to the foregoing UE, in a large transmission delay scenario, a value range of a timing advance calculated by using a baseline value is definitely smaller than a value range of a transmission delay value. Therefore, overheads of the timing advance can be effectively reduced.

Figure 16:
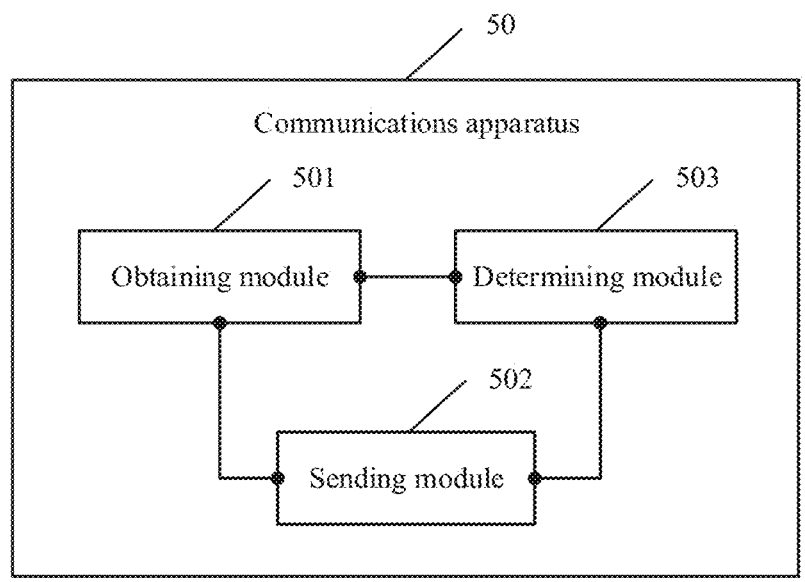
FIG. 16 is a schematic diagram of another embodiment of user equipment according to the embodiments of this application.

Optionally, based on the embodiment corresponding to FIG. 15, referring to FIG. 16, in another embodiment of the communications apparatus 50 provided in the embodiments of this application, the obtaining module 501 is specifically configured to receive the baseline value by using at least one of a broadcast message, downlink control information DCI, group DCI, radio resource control RRC information, and a media access control MAC unit;

the communications apparatus 50 further includes a determining module 503; and the determining module 503 is configured to determine the timing advance based on the baseline value and a transmission delay value after the obtaining module 501 obtains the baseline value, where the transmission delay value indicates a propagation delay of data transmission between a base station and user equipment UE.

In addition, in this embodiment of this application, the UE may further receive, by using at least one of the broadcast message, the DCI, the group DCI, the RRC information, and the MAC CE, the baseline value sent by the base station. In the foregoing manner, the base station may simultaneously send the baseline values to all UEs in a cell, or may separately send the baseline value to each UE, so that the solution can be applied to different scenarios, thereby improving flexibility and practicability of the solution. In addition, the UE side may further measure the timing advance, reflecting feasibility of the solution.

Figure 17:
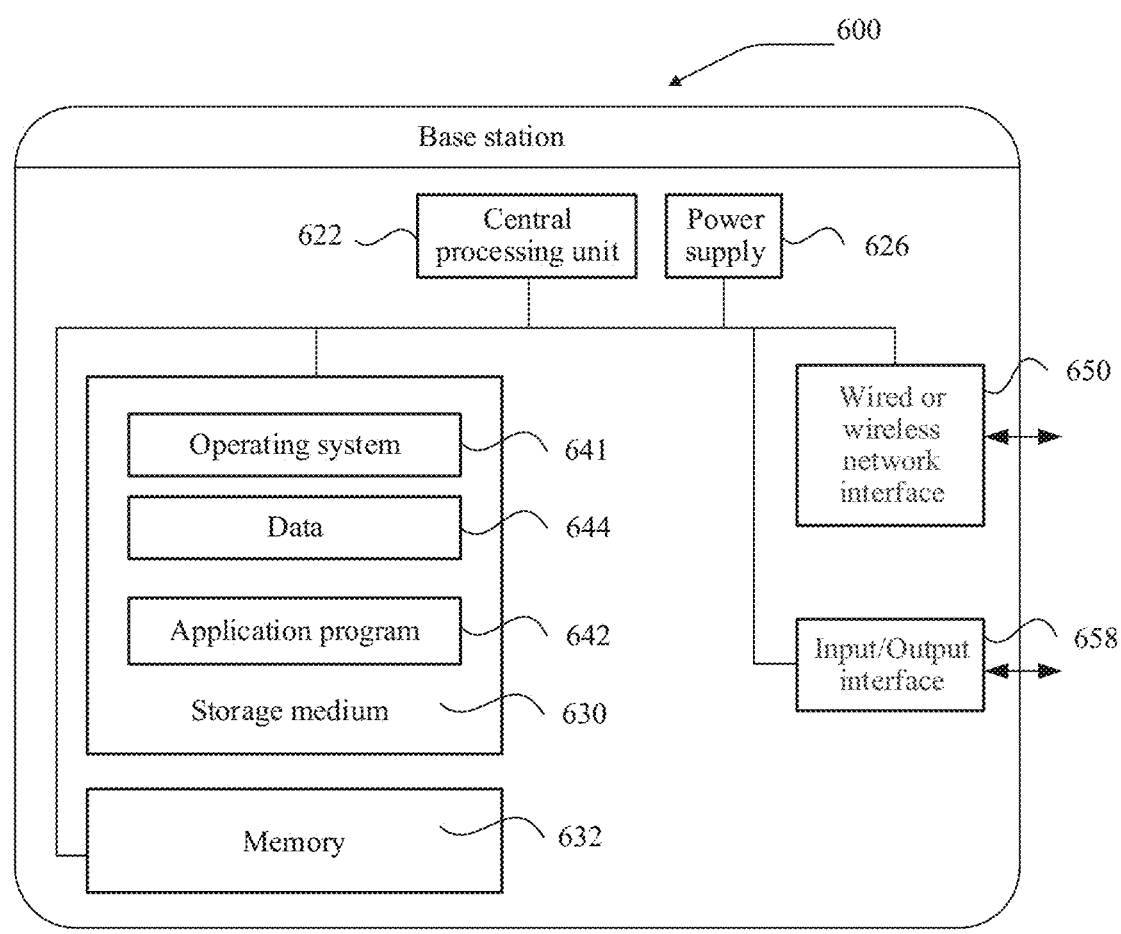
FIG. 17 is a schematic structural diagram of a base station according to an embodiment of this application.

FIG. 17 is a schematic structural diagram of a base station according to an embodiment of the present invention. The base station 600 may have a relatively large difference due to different configurations or performance, and may include one or more central processing units (CPU) 622 (for example, one or more processors), a memory 632, one or more storage media 630 (for example, one or more mass storage devices) that store an application program 642 or data 644. The memory 632 and the storage medium 630 may also be temporary storage or permanent storage. The program stored in the storage medium 630 may include one or more modules (not shown), and each module may include a series of instruction operations for the base station. Further, the central processing unit 622 may be configured to communicate with the storage medium 630, and perform, on the base station 600, the series of instruction operations in the storage medium 630.

The base station 600 may further include one or more power supplies 626, one or more wired or wireless network interfaces 650, one or more input/output interfaces 658, and/or one or more operating systems 641 such as Windows Server™, Mac OS X™ Unix™, Linux™, and FreeBSD™.

The steps performed by the base station in the foregoing embodiments may be based on a base station structure shown in FIG. 17.

The CPU 622 is configured to perform the following steps:

obtaining a baseline value, where the baseline value is used to indicate a time interval between downlink frame timing and uplink frame timing, the baseline value is used to determine a timing advance, and the timing advance is used to send uplink data; and receiving the uplink data.

Optionally, the CPU 622 is specifically configured to perform the following steps:

obtaining a satellite type of a target satellite, where the target satellite is a satellite that communicates with user equipment UE; and determining the baseline value based on the satellite type of the target satellite.

Optionally, the CPU 622 is further configured to perform the following steps:

determining the timing advance based on the baseline value and a transmission delay value, where the transmission delay value indicates a propagation delay of data transmission between the base station and the UE; and sending the timing advance to the UE.

Optionally, the CPU 622 is further configured to perform the following steps:

sending the baseline value to the UE, where the baseline value is used to determine the timing advance of the UE.

Optionally, the CPU 622 is specifically configured to perform the following steps:

sending the baseline value to the UE by using at least one of a broadcast message, downlink control information DCI, group DCI, radio resource control RRC information, and a media access control MAC unit.

Figure 18:
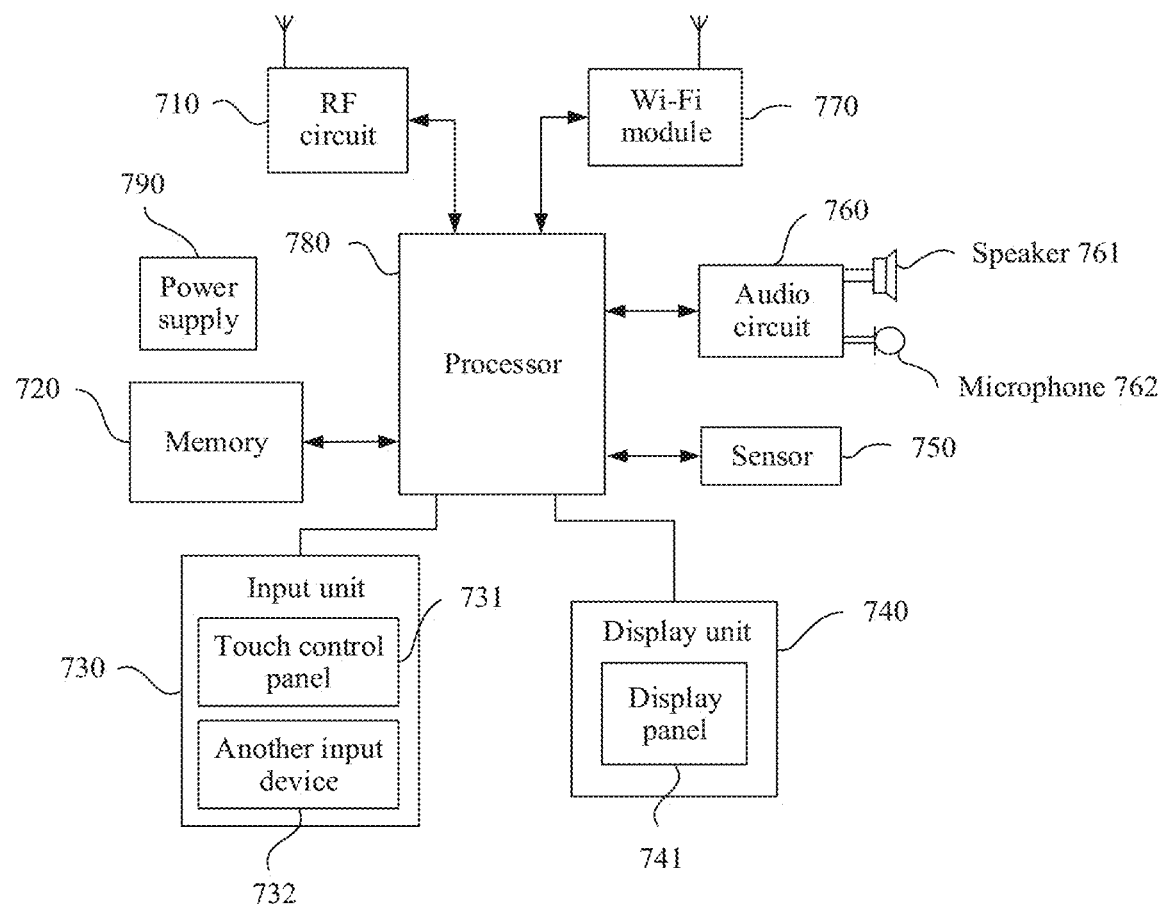
FIG. 18 is a schematic structural diagram of user equipment according to an embodiment of this application.

An embodiment of the present invention further provides another UE, as shown in FIG. 18. For ease of description, only a part related to this embodiment of the present invention is illustrated. For specific technical details that are not disclosed, refer to the method parts in the embodiments of the present invention. The UE may be any terminal device including a mobile phone, a tablet computer, a personal digital assistant (PDA), a point of sales (POS), a vehicle-mounted computer, or the like. For example, the UE is a mobile phone.

FIG. 18 is a block diagram of a partial structure of a mobile phone related to the UE provided in the embodiments of the present invention. Referring to FIG. 18, the mobile phone includes components such as a radio frequency (RF) circuit 710, a memory 720, an input unit 730, a display unit 740, a sensor 750, an audio circuit 760, a wireless fidelity (Wi-Fi) module 770, a processor 780, and a power supply 790. A person skilled in the art may understand that, the structure of the mobile phone shown in FIG. 18 does not constitute a limitation on the mobile phone, and the mobile phone may include more or fewer components than those shown in the figure, or combine some components, or have different component arrangements.

All components of the mobile phone are described below in detail with reference to FIG. 18.

The RF circuit 710 may be configured to receive and send information, or receive and send a signal in a call process. Particularly, the RF circuit 710 receives downlink information from a base station, and sends the downlink information to the processor 780 for processing. In addition, the RF circuit 710 sends designed uplink data to the base station. Generally, the RF circuit 710 includes but is not limited to an antenna, at least one amplifier, a transceiver, a coupler, a low noise amplifier (LNA), a duplexer, and the like. In addition, the RF circuit 710 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 720 may be configured to store a software program and module. By running the software program and module stored in the memory 720, the processor 780 executes various function applications and data processing of the mobile phone. The memory 720 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 720 may include a high-speed random access memory, and may further include a nonvolatile memory, for example, at least one magnetic disk storage device, a flash storage device, or another volatile solid-state storage device.

The input unit 730 may be configured to receive input digital or character information, and generate key signal input related to user setting and function control of the mobile phone. Specifically, the input unit 730 may include a touch control panel 731 and another input device 732. The touch control panel 731, also referred to as a touchscreen, may collect a touch operation (for example, an operation performed by a user on the touch control panel 731 or near the touch control panel 731 by using any proper object or accessory such as a finger or a stylus) performed by the user on or near the touch control panel 731, and drive a corresponding connection apparatus based on a preset program. Optionally, the touch panel 731 may include two parts: a touch detection apparatus and a touch controller. The touch detection apparatus detects a touch direction of the user, detects a signal brought by the touch operation, and transfers the signal to the touch controller. The touch controller receives touch information from the touch detection apparatus, converts the touch information into coordinates of a touch point, and sends the coordinates to the processor 780. In addition, the touch controller can receive and execute a command sent by the processor 780. In addition, the touch control panel 731 may be implemented by using a plurality of types such as a resistive type, a capacitive type, an infrared type, and a surface acoustic wave type. The input unit 730 may include another input device 732 in addition to the touch control panel 731. Specifically, the another input device 732 may include but is not limited to one or more of a physical keyboard, a function key (for example, a volume control key or an on/off key), a trackball, a mouse, a joystick, or the like.

The display unit 740 may be configured to display information input by the user or information provided for the user, and various menus of the mobile phone. The display unit 740 may include a display panel 741. Optionally, the display panel 741 may be configured in a form of a liquid crystal display (LCD), an organic light-emitting diode (OLED), and the like. Further, the touch control panel 731 may cover the display panel 741. When detecting a touch operation on or near the touch control panel 731, the touch control panel 731 transmits the touch operation to the processor 780 to determine a type of a touch event, and then the processor 780 provides a corresponding visual output on the display panel 741 based on the type of the touch event. In FIG. 18, the touch control panel 731 and the display panel 741 are used as two independent components to implement input and output functions of the mobile phone. However, in some embodiments, the touch panel 731 and the display panel 741 may be integrated to implement the input and output functions of the mobile phone.

The mobile phone may further include at least one sensor 750, such as an optic sensor, a motion sensor, and another sensor. Specifically, the optical sensor may include an ambient light sensor and a proximity sensor. The ambient light sensor may adjust luminance of the display panel 741 based on brightness of ambient light, and when the mobile phone approaches an ear, the proximity sensor may turn off the display panel 741 and/or backlight. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein.

The audio circuit 760, a loudspeaker 761, and a microphone 762 may provide an audio interface between the user and the mobile phone. The audio circuit 760 may transmit, to the loudspeaker 761, an electrical signal that is obtained after conversion of received audio data, and the loudspeaker 761 converts the electrical signal into an acoustic signal and outputs the acoustic signal. In addition, the microphone 762 converts a collected acoustic signal into an electrical signal, the audio circuit 760 receives and converts the electrical signal into audio data, and outputs the audio data to the processor 780 for processing, and then processed audio data is sent to, for example, another mobile phone, by using the RF circuit 710, or the audio data is output to the memory 720 for further processing.

Wi-Fi is a short-distance wireless transmission technology. With the Wi-Fi module 770, the mobile phone may help the user send and receive an email, browse a web page, access streaming media, and the like. The Wi-Fi module 770 provides wireless access to the broadband internet for the user. Although FIG. 18 shows the Wi-Fi module 770, it may be understood that the Wi-Fi module is not a mandatory component of the mobile phone, and may be omitted as required as long as the scope of the essence of the present invention is not changed.

The processor 780 is a control center of the mobile phone, connects each part of the entire mobile phone by using various interfaces and lines, and executes various functions and processes data of the mobile phone by running or executing the software program and/or the module stored in the memory 720 and invoking data stored in the memory 720, to perform overall monitoring on the mobile phone. Optionally, the processor 780 may include one or more processing units. Optionally, an application processor and a modem processor may be integrated in the processor 780. The application processor mainly processes an operating system, a user interface, an application program, and the like. The modern processor mainly processes wireless communication. It should be understood that, the modulation-demodulation processor may also not be integrated in the processor 780.

The mobile phone further includes the power supply 790 (such as a battery) that supplies power to each component. Optionally, the power supply may be logically connected to the processor 780 by using a power management system, so that functions such as management of charging, discharging, and power consumption are implemented by using the power management system.

Although not shown, the mobile phone may further include a camera, a Bluetooth module, and the like. Details are not described herein.

In this embodiment of the present invention, the processor 780 included in the terminal further has the following functions:

obtaining a baseline value, where the baseline value is used to indicate a time interval between downlink frame timing and uplink frame timing, the baseline value is used to determine a timing advance, and the timing advance is used to send uplink data; and sending the uplink data by using the timing advance.

Optionally, the processor 780 is specifically configured to perform the following function:

receiving the baseline value by using at least one of a broadcast message, DCI, group DCI, RRC information, and a MAC CE.

The processor 780 is further configured to perform the following function:

determining the timing advance based on the baseline value and a transmission delay value, where the transmission delay value indicates a propagation delay of data transmission between the base station and user equipment UE.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
    obtaining a satellite type that comprises an altitude and an on-board processing capability of a target satellite;
    determining a baseline value for each user equipment (UE) of a plurality of UEs based on the satellite type, wherein the baseline value indicates a time interval between a downlink frame timing of a base station that serves the plurality of UEs and an uplink frame timing of the base station, and wherein the baseline value is associated with a timing advance for sending uplink data by a corresponding UE of the plurality of UEs; and
    receiving the uplink data from the corresponding UE.

2. The method according to claim 1, wherein the method further comprises:
    determining the timing advance based on the baseline value and a transmission delay value, wherein the transmission delay value indicates a propagation delay of data transmission between a base station and a UE; and
    sending the timing advance to the corresponding UE.

3. The method according to claim 1, wherein the method further comprises:
    sending the baseline value to a UE, wherein the baseline value determines the timing advance of the UE.

4. The method according to claim 3, wherein the baseline value is sent to the UE by including the baseline value in at least one of a broadcast message, downlink control information (DCI), group DCI, radio resource control (RRC) information, or a media access control (MAC) control element.

5. A data transmission method, comprising:
    obtaining a satellite type comprising an altitude and an on-board processing capability of a target satellite;
    determining a baseline value based on the satellite type, wherein the baseline value indicates a time interval between a downlink frame timing of the base station and an uplink frame timing of the base station, wherein the baseline value is associated with a timing advance for sending uplink data; and
    sending the uplink data based on the timing advance.

6. The method according to claim 5, wherein the baseline value is obtained from at least one of a broadcast message, downlink control information (DCI), group DCI, radio resource control (RRC) information, or a media access control (MAC) control element; and
    the method further comprises: determining the timing advance based on the baseline value and a transmission delay value, wherein the transmission delay value indicates a propagation delay of data transmission between a base station and a user equipment (UE).

7. A communications apparatus, comprising at least one processor and a non-transitory computer-readable storage medium coupled to the at least one processor and storing programming instructions for execution by the at least one processor, the programming instructions instruct the at least one processor to:
    obtain a satellite type comprising an altitude and an on-board processing capability of a target satellite;
    determine a baseline value for each user equipment (UE) of a plurality of UEs based on the satellite type, wherein the baseline value indicates a time interval between a downlink frame timing of a base station that serves the plurality of UEs and an uplink frame timing of the base station, and wherein the baseline value is associated with a timing advance for sending uplink data by a corresponding UE of the plurality of UEs; and
    receive the uplink data from the corresponding UE.

8. The communications apparatus according to claim 7, wherein the programming instructions further instruct the at least one processor to:
    obtain a satellite type of a target satellite that communicates with the corresponding UE; and
    determine the baseline value based on the satellite type.

9. The communications apparatus according to claim 7, wherein the programming instructions further instruct the at least one processor to:
    determining the timing advance based on the baseline value and a transmission delay value, wherein the transmission delay value indicates a propagation delay of data transmission between a base station and a UE; and sending the timing advance to the corresponding UE.

10. The communications apparatus according to claim 7, wherein the programming instructions further instruct the at least one processor to:

send the baseline value to a UE, wherein the baseline value determines the timing advance of the UE.

11. The communications apparatus according to claim 10, wherein the baseline value is sent to the UE by including the baseline value in at least one of a broadcast message, downlink control information (DCI), group DCI, radio resource control (RRC) information, or a media access control (MAC) control element.

12. A communications apparatus, comprising at least one processor and a non-transitory computer-readable storage medium coupled to the at least one processor and storing programming instructions for execution by the at least one processor, the programming instructions instruct the at least one processor to:

obtain a satellite type comprising an altitude and an on-board processing capability of a target satellite;

determine a baseline value based on the satellite type, wherein the baseline value indicates a time interval between a downlink frame timing of the base station and an uplink frame timing of the base station, wherein the baseline value is associated with a timing advance for sending uplink data; and send the uplink data based on the timing advance.

13. The communications apparatus according to claim 12, wherein the baseline value is obtained from at least one of a broadcast message, downlink control information (DCI), group DCI, radio resource control (RRC) information, or a media access control (MAC) control element; and the programming instructions further instruct the at least one processor to:

determine the timing advance based on the baseline value and a transmission delay value, wherein the transmission delay value indicates a propagation delay of data transmission between a base station and a user equipment (UE).

14. A non-transitory computer-readable storage medium coupled to at least one processor, and storing programming instructions for execution by the at least one processor, the programming instructions instruct the at least one processor to perform the method according to claim 1.

15. A non-transitory computer-readable storage medium coupled to at least one processor, and storing programming instructions for execution by the at least one processor, the programming instructions instruct the at least one processor to perform the method according to claim 5.

* * * * *